United States Patent
Tomobe et al.

(10) Patent No.: US 8,291,464 B2
(45) Date of Patent: Oct. 16, 2012

(54) DIGITAL BROADCAST RECEIVING APPARATUS

(75) Inventors: Osamu Tomobe, Hitachi (JP); Yukihiro Kawamata, Hitachi (JP); Takaharu Ishida, Hitachinaka (JP); Kimiya Yamaashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 859 days.

(21) Appl. No.: 12/422,015

(22) Filed: Apr. 10, 2009

(65) Prior Publication Data

US 2009/0190668 A1 Jul. 30, 2009

Related U.S. Application Data

(63) Continuation of application No. 10/321,351, filed on Dec. 18, 2002, now abandoned.

(30) Foreign Application Priority Data

Mar. 15, 2002 (JP) ................................. 2002-072574

(51) Int. Cl.
- *H04N 7/173* (2011.01)
- *H04N 7/12* (2006.01)
- *H04B 1/66* (2006.01)

(52) U.S. Cl. ... 725/131; 725/118; 375/240; 375/240.24; 375/240.27

(58) Field of Classification Search ......................... None
See application file for complete search history.

(56) References Cited

U.S. PATENT DOCUMENTS

| | | | | |
|---|---|---|---|---|
| 5,946,052 A | * | 8/1999 | Ozkan et al. | 348/555 |
| 6,639,555 B1 | * | 10/2003 | Kane et al. | 343/700 MS |
| 6,975,777 B1 | * | 12/2005 | Kenmochi | 382/268 |
| 7,275,254 B1 | * | 9/2007 | Jutzi | 725/72 |
| 2003/0103446 A1 | | 6/2003 | Negishi et al. | |
| 2003/0197809 A1 | * | 10/2003 | Gangitano | 348/570 |
| 2005/0108759 A1 | * | 5/2005 | Arsenault et al. | 725/72 |

FOREIGN PATENT DOCUMENTS

| | | |
|---|---|---|
| JP | 10322704 | 12/1998 |
| JP | 11-164294 | 6/1999 |
| JP | 11-284925 A | 10/1999 |
| JP | 11284925 A * | 10/1999 |
| JP | 2000-115119 A | 4/2000 |
| JP | 2000-165766 A | 6/2000 |
| JP | 2001-274769 A | 10/2001 |
| JP | 2002-009854 A | 1/2002 |
| WO | WO 02/17524 | 2/2002 |

OTHER PUBLICATIONS

Digital Receiver for Digital Satellite Broadcasting Services Using Broadcasting Satellites. ARIB STD-B21, Version 1.0 (Oct. 26, 1999).*

Transmission System for Digital Terrestrial Television Broadcasting. ARIB STD-B31, Version 1.0 (May 2001).*

* cited by examiner

*Primary Examiner* — Brian Pendleton
*Assistant Examiner* — Jason K Lin
(74) *Attorney, Agent, or Firm* — Antonelli, Terry, Stout & Kraus, LLP.

(57) ABSTRACT

A digital broadcast receiving apparatus receives a digital broadcast signal, which consists of layers each obtained by dividing a transmission bandwidth into a plurality of segments and combining some of the segments, and outputs images and/or sound from one of the layers constituting the received digital signal. This apparatus is characterized by comprising broadcasting format retention means (channel to broadcasting format correspondence table database) for retaining the broadcasting format, for each layer, of each broadcast station and switching means (layer switching means) for switching the output layer based on the broadcasting format, for each layer, of each broadcast station retained in the broadcasting retention means. Thus, this apparatus can output images and sound without interruption.

2 Claims, 22 Drawing Sheets

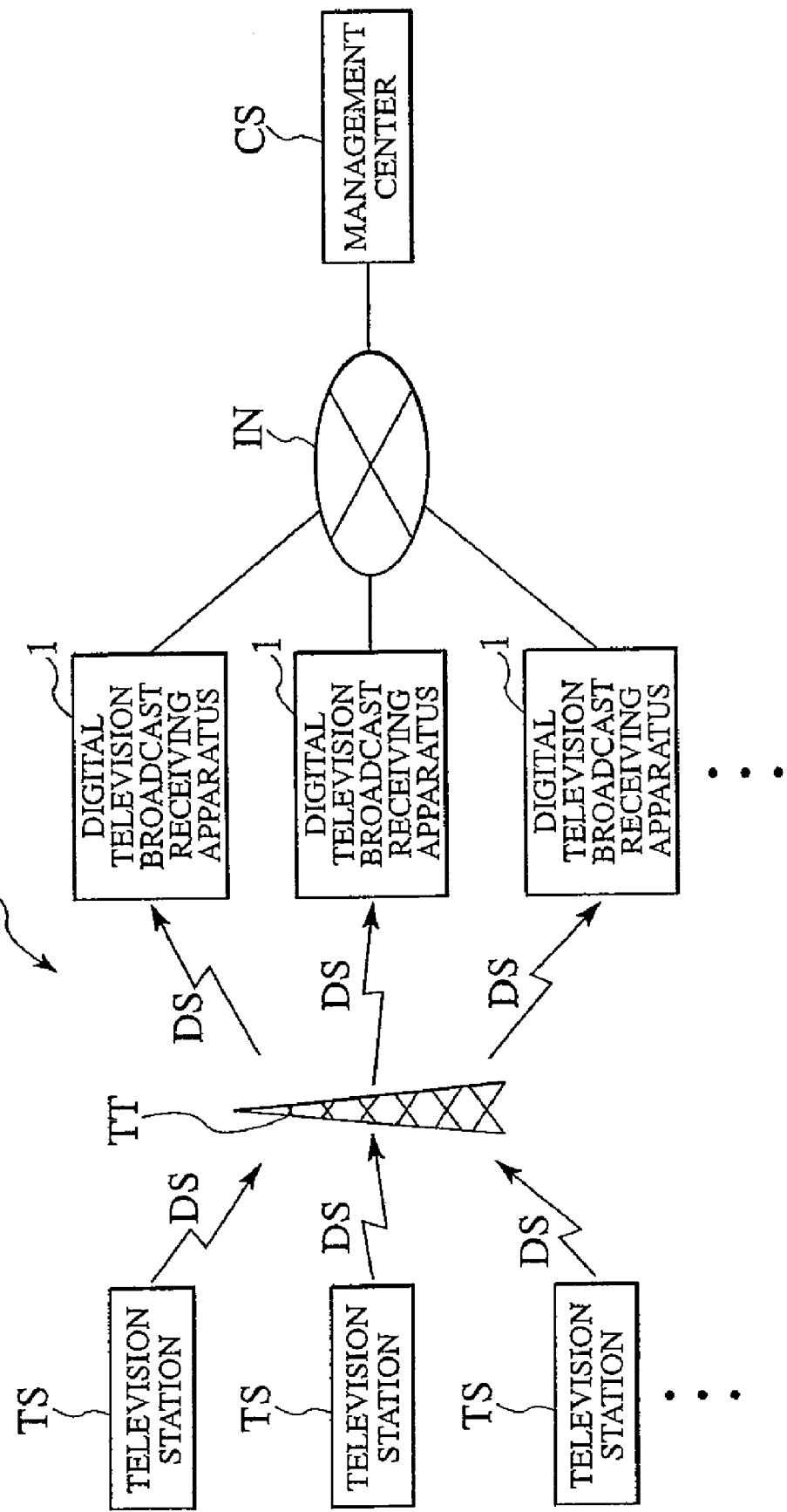

DIVISION INTO (1+12) SEGMENTS

DIVISION INTO (1+9+3) SEGMENTS

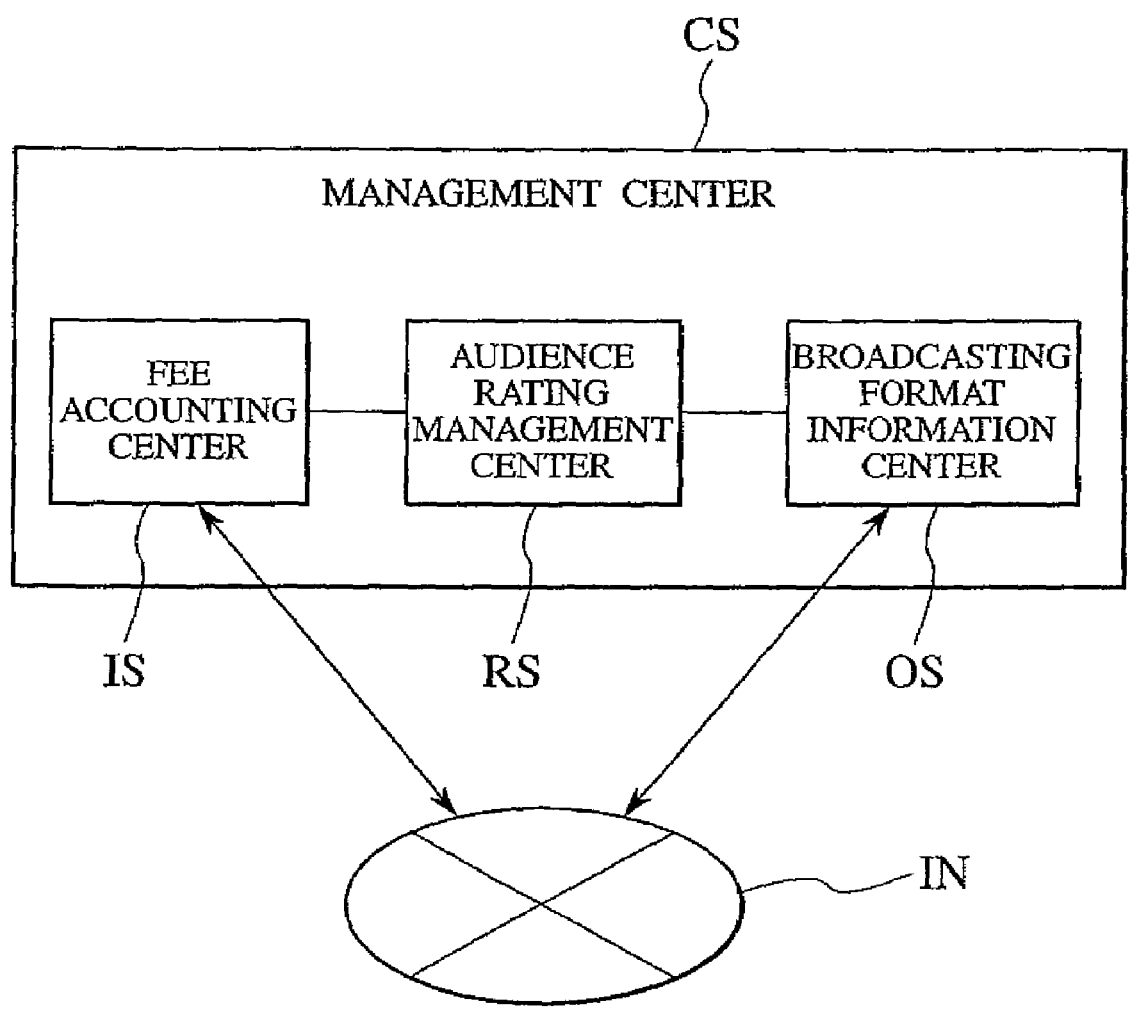

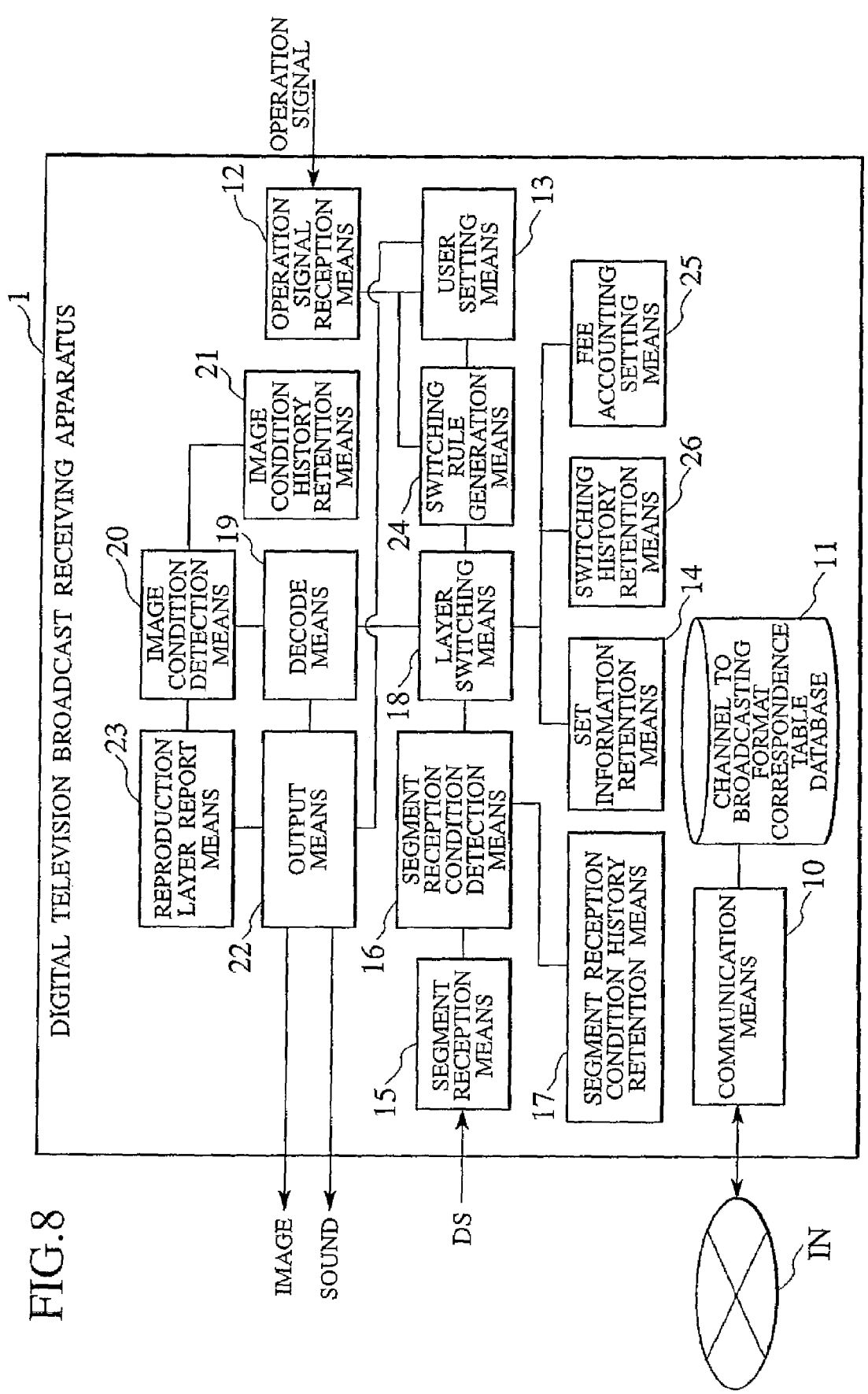

| No. | CHANNEL | BROADCASTING FORMAT CODE |
|---|---|---|
| 1 | 200ch | 0x0001 |
| 2 | 201ch | 0x0002 |
| 3 | 202ch | 0x0003 |
| 4 | 203ch | 0x0004 |

| BROADCASTING FORMAT CODE | No. OF LAYERS | LAYER TYPE | MODE | MODULATION METHOD | GUARD INTERVAL | INNER CODE | No. OF SEGMENTS |
|---|---|---|---|---|---|---|---|
| 0x0001 | 2 | A | 1 | DQPSK | 1/4 | 7/8 | 1 |
| | | B | 1 | 16QAM | 1/16 | 3/4 | 12 |
| 0x0002 | 3 | A | 3 | DQPSK | 1/4 | 7/8 | 1 |
| | | B | 3 | 16QAM | 1/16 | 3/4 | 9 |
| | | C | 3 | 64QAM | 1/16 | 3/4 | 3 |

RECEPTION MODE SETTING

● IMAGE QUALITY CONSIDERED

○ WAVE CONDITION CONSIDERED

○ BOTH IMAGE QUALITY AND
  WAVE CONDITION CONSIDERED

FEE ACCOUNTING SETTING

● IMAGE QUALITY ORIENTED ACCOUNTING

○ CONTINUITY ORIENTED ACCOUNTING

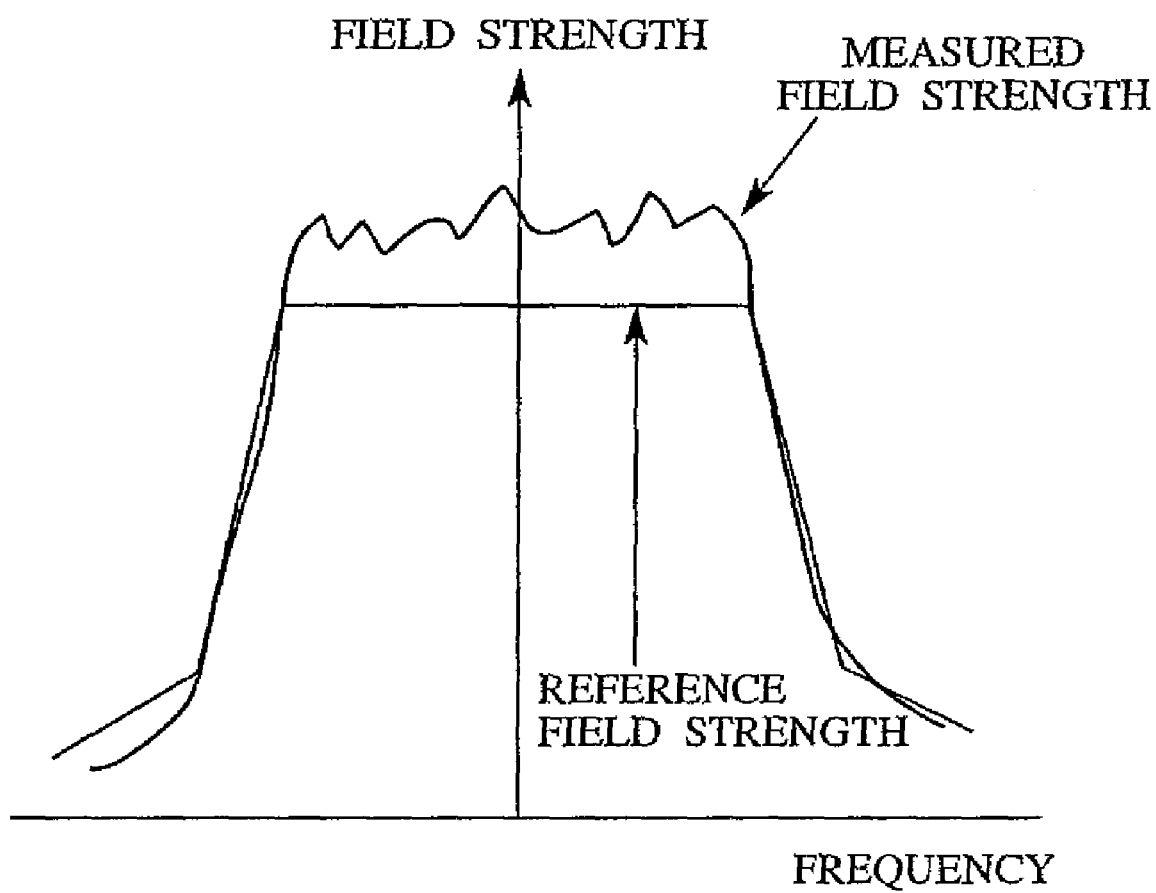

MACRO BLOCK

MACRO BLOCK    BLOCK NOISE

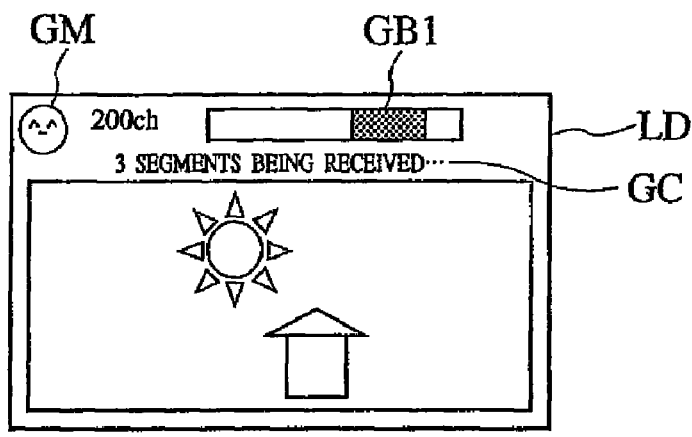
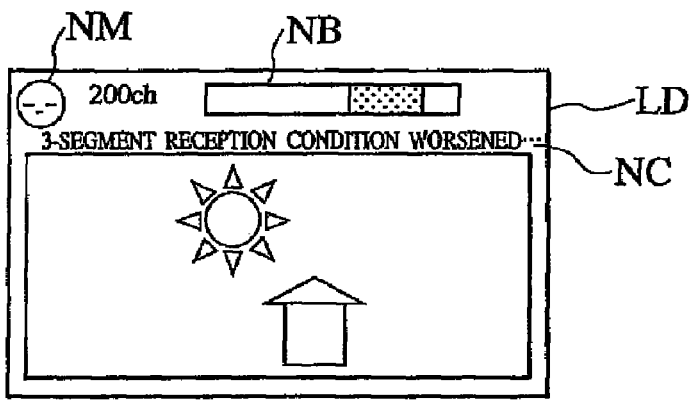
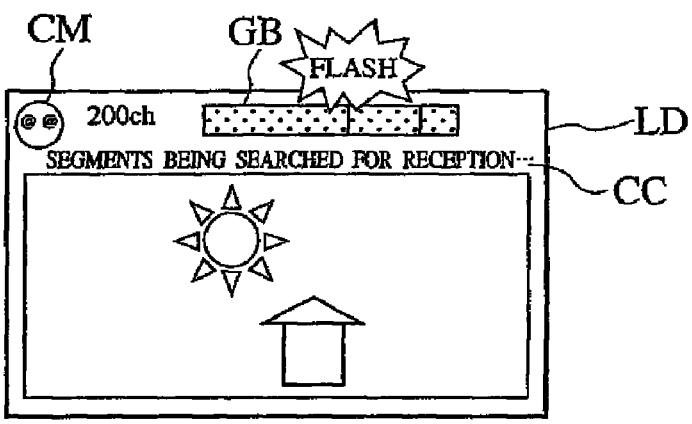
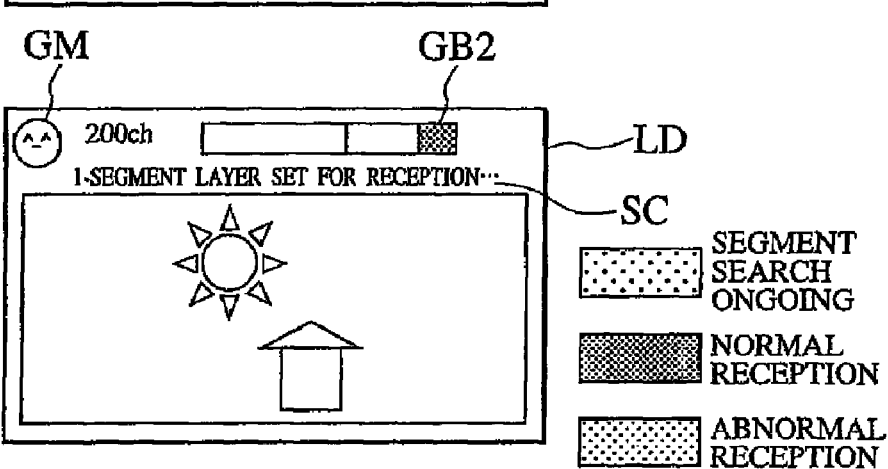

FIG.17

FEE ACCOUNTING INFORMATION  USER ID : 0x1234fff   JAN. 1, 2002

26a

| RECEPTION CHANNEL | RECEPTION LAYER | RECEPTION TIME | LATITUDE | LONGITUDE | FIELD STRENGTH | IMAGE CONDITION | TIME |
|---|---|---|---|---|---|---|---|
| 200ch | A LAYER | 13:00~14:00 | 325.33 | 45.77 | 100dB | GOOD | 13:00 |
| | | | 324.36 | 45.74 | 50dB | BAD | 13:10 |
| | | | ... | ... | ... | ... | ... |
| 201ch | C LAYER | 14:00~15:00 | 324.72 | 45.78 | 70dB | GOOD | 14:00 |
| | | | 324.80 | 45.79 | 100dB | GOOD | 14:10 |
| | | | ... | ... | ... | ... | ... |

DIGITAL BROADCAST RECEIVING APPARATUS

CROSS REFERENCE TO RELATED APPLICATION

This application is a Continuation of U.S. application Ser. No. 10/321,351, filed Dec. 18, 2002 now abandoned, which claims priority from Japanese Patent Application No. 2002-072574, filed on Mar. 15, 2002, the contents of which are incorporated herein by reference.

BACKGROUND OF THE INVENTION

The present invention relates to a digital broadcast receiving apparatus and to a digital broadcast receiving method that are applicable to hierarchical transmission digital broadcasting.

Recently, with the commencement of CS (Communications Satellite) digital broadcasting, followed by BS (Broadcasting Satellite) digital broadcasting, satellite digital broadcasting is becoming increasing popular. In digital broadcasting, one wave can carry a plurality of image, sound and other data contents, and data can be compressed without quality deterioration, making it possible to set a number of channels to a transmission bandwidth, that is typically assigned to one channel in conventional analog broadcasting.

Further, terrestrial digital broadcasting is scheduled to start in 2003. According to the proposed plan, terrestrial broadcasting will employ a hierarchical transmission method in which the transmission bandwidth assigned to each broadcasting station is divided into a number of segments, and a plurality of layers, each consisting of one or more segments, will be transmitted concurrently. In such hierarchical transmission, maximizing the number of segments constituting a layer provides for higher quality data transmission, but results in less robust mobile reception by receivers on movable bodies, such as automobiles. Therefore, each broadcasting station intends to use a plurality of layers that vary in the number of segments therein, so as to provide a plurality of services suited respectively for fixed reception by home receivers, etc., mobile reception by automobile receivers, etc. and/or portable reception by portable telephones. In response to this approach, electrical equipment manufacturers and others are developing digital broadcast reception apparatuses that are applicable to hierarchical transmission terrestrial digital broadcast.

When a digital broadcast signal, either from a radio wave tower or a relay station of a broadcasting station, is received by a digital broadcast receiving apparatus mounted on a movable body, such as an automobile, the field strength of the received digital broadcast signal changes, since the receiving apparatus is sometimes shaded from the wave by a building or the like and the distance from the station changes as the movable body travels. In addition, while the movable body is getting closer to or farther from the station, each frequency of the carrier wave received directly from the station differs from that of a reflected wave received via a building due to the Doppler effect. Because of such fading (frequency interference), this changes the field strength of the received digital broadcast signal and makes it difficult for the digital broadcast receiving apparatus to appropriately choose from carrier waves, each consisting of multiple carrier frequencies modulated so as to encode data, resulting in a deteriorated image and poor sound quality. Further, the field strength of the received digital broadcast signal may also weaken when the movable body is exposed to bad weather conditions and is moving at a high speed.

Therefore, the image and sound reproduced by a digital broadcast receiving apparatus on a movable body is interrupted or confused as the case may be. If the image and sound is degraded in like this way, the user of the digital broadcast receiving apparatus tends to feel uncomfortable and is motivated to operate the apparatus to select another channel or another layer of the same channel. Further, if the image and sound are interrupted, commercials cannot be provided to the user, resulting in a lowered advertising potential.

SUMMARY OF THE INVENTION

Accordingly, it is an object of the present invention to provide a digital broadcast receiving apparatus and a digital broadcast receiving method that are capable of outputting images and sound without being interrupted.

To solve the problems mentioned above, a digital broadcast receiving apparatus that is applicable to a hierarchical transmission digital broadcast according to the present invention is characterized in that the optimum layer is selected according to the field strength of the received digital broadcast signal and/or the states of reproduced images, etc., and the reception is switched to the selected layer based on the broadcasting format defined for the layer by the station.

According to the present invention, even when images and sound are likely to be interrupted due to bad reception conditions of the layer, it is possible to continuously output images and sound by switching to another layer providing better reception conditions.

BRIEF DESCRIPTION OF THE DRAWINGS

Other objects and advantages of the invention will become apparent from the following description of various embodiments, with reference to the accompanying drawings, in which:

FIG. 1 is a general block diagram of a terrestrial digital broadcasting system according to the invention;

FIG. 7 a block diagram of a management center according to the invention;

FIG. 8 is a block diagram of a digital television broadcast receiving apparatus according to the invention;

FIG. 9A is a diagram showing a channel to broadcasting format code correspondence table, and FIG. 9B is a diagram showing a broadcasting format code to broadcasting format correspondence table;

FIG. 12 is a diagram which shows a reception mode setting screen of the digital television broadcast receiving apparatus according to the invention;

FIG. 13 is a diagram which shows a fee accounting setting screen of the digital television broadcast receiving apparatus according to the embodiment;

FIG. 14 is a graph showing how the field strength of a received digital broadcast signal is detected;

FIGS. 16A to 16D show how reception conditions are indicated by the digital television receiving apparatus according to the invention, with FIG. 16A showing a screen displayed when a 3-segment layer is normally received, FIG. 16B showing a screen displayed when the 3-segment layer is abnormally received, FIG. 16C showing a screen displayed when layers are searched for reception, FIG. 16D showing a screen displayed after a 1-segment layer is selected;

FIG. 17 is a table which shows a data configuration of fee accounting information according to the invention;

PREFERRED EMBODIMENT OF THE INVENTION

Figure 2A:
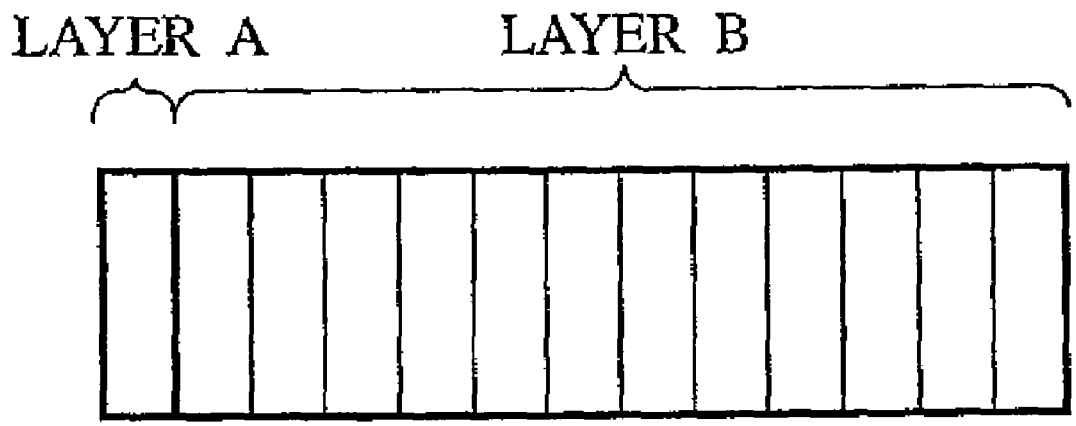
FIG. 2A is a diagram showing an example in which the transmission bandwidth is divided into (1+12) segments.

An embodiment of a digital broadcast receiving apparatus and a digital broadcast receiving method according to the present invention will be described with reference to the drawings.

A digital broadcast receiving apparatus is provided according to the present invention, which apparatus receives a digital broadcast signal that consists of layers, each obtained by dividing a transmission bandwidth into plural segments and combining some of the segments, and outputs images and/or sound from one of the layers constituting the received digital signal. The apparatus is characterized by broadcasting format retention means for retaining data on a broadcasting format, for each layer, of each broadcast station; and switching means for switching the output layer based on the broadcasting format, for each layer, of each broadcast station retained by the broadcasting format retention means. This digital broadcast receiving apparatus can continuously output images and sound by switching to a better reception condition layer even if the current output layer is experiencing bad reception conditions.

This digital broadcast receiving apparatus is further characterized by field strength detection means for detecting the field strength of a received digital broadcast signal, and/or reproduction condition detection means for detecting a reproduction condition of each layer of the received digital broadcast signal; and layer decision means for determining which layer to output based on the detected field strength and/or the reproduction condition. This digital broadcast receiving apparatus can determine which layer to output by judging the reception condition of each layer based on the field strength and/or reproduction condition, such as the image quality, so that images and sound can be continuously output.

This digital broadcast receiving apparatus is further characterized in that data on the broadcasting format, for each layer, of each broadcast station is obtained by a broadcast or a non-broadcast communication medium. Even if a broadcast station changes the broadcasting format of some layer, this digital broadcast receiving apparatus is quickly notified of the new broadcasting format and, therefore, can immediately output the selected layer when the layer is selected.

This digital broadcast receiving apparatus further comprises history retention means for retaining layer switching records and communication means and is characterized in that records retained in the history retention means are transmitted to a digital broadcast fee accounting center via the communication means. This digital broadcast receiving apparatus can provide the fee accounting center with information for reception fee calculation.

A digital broadcast receiving apparatus is provided according to the present invention, which apparatus receives a digital broadcast signal that consists of layers, each obtained by dividing a transmission bandwidth into a plurality of segments and combining some of the segments, and outputs at least images from one of the layers constituting the received digital signal. The apparatus is characterized by broadcasting format retention means for retaining data on a broadcasting format, for each layer, of each broadcast station; switching means for switching the output layer based on the broadcasting format, for each layer, of each broadcast station retained by the broadcasting format retention means; field strength detection means for detecting a field strength of the received digital broadcast signal and/or reproduction condition detection means for detecting a reproduction condition of each layer of the received digital broadcast signal; layer decision means for determining which layer to output based on the detected field strength and/or the detection reproduction condition; and setting screen supply means for providing a screen for determining whether the output layer is to be selected based on the detected field strength, the detected reproduction condition, or both the detected field strength and the detected reproduction condition. This digital broadcast receiving apparatus allows the user to set a principle for automatic layer switching.

This digital broadcast receiving apparatus is further characterized by layer information display means for displaying information about the currently output layer in a screen. When automatic layer switching is carried out, this digital broadcast receiving apparatus can notify the user of the situation.

A digital broadcast receiving method is provided according to the present invention, in which a digital broadcast signal is received that consists of layers, each obtained by dividing a transmission bandwidth into a plurality of segments and combining some of the segments, and in which images and/or sound are output from one of the layers constituting the received digital signal. The method is characterized by the steps of: detecting the field strength and/or the detected reproduction condition of each layer of the received digital broadcast signal; determining which layer to output based on the detected field strength and/or the received reproduction condition; and switching the output layer to the determined layer based on the broadcasting format, for each layer, of each broadcast station. This method can continuously output images and sound by automatically switching the output to a better reception condition layer, even if the current output layer is experiencing bad reception conditions.

This digital broadcast receiving method is further characterized by the step of getting the broadcasting format, for each layer, of each broadcast station via a broadcast or a non-broadcast communication medium. In this method, even if a broadcast station changes the broadcasting format of its layer, it is possible to quickly be notified of the new broadcasting format and, therefore, immediately output the selected layer when the layer is selected.

The broadcasting format of each layer is determined by coding parameters for transmission set for each layer by the broadcast station. The parameters determine the mode, carrier modulation method, guard interval, error correction inner code, etc. The reproduction condition of a layer refers to the condition of images and sound reproduced from the layer included in the received digital broadcast signal and is represented by, for example, image quality and sound quality. The non-broadcast communication medium is a wired medium, such as a telephone circuit, or a radio medium, such as a satellite circuit. Provided with communication means, the digital broadcast fee accounting center is an office of a company that performs a fee accounting service on behalf of each digital broadcast station. This center may be operated in various styles. For example, the company may be operated either independently from all broadcast stations or jointly by all broadcast stations.

It is assumed that each digital broadcast receiving apparatus of the present invention, implemented according to the embodiment described hereinafter, is mounted in an automobile. Each digital broadcast receiving apparatus is an apparatus for outputting images and sound by receiving television program content-carried digital broadcast signals from a great number of television stations in a terrestrial digital television broadcasting system. The terrestrial digital television broadcasting system according to the embodiment employs OFDM (Orthogonal Frequency Division Multiplexing) as the modulation method and uses a television tower to transmit the digital broadcast signals from the respective television stations. The terrestrial digital television broadcasting system according to the invention has a management center which is connected with each digital television broadcast receiving apparatus via the Internet. This management center performs such operations as provision of an information service for each television station and a fee accounting service.

First, with reference to FIG. 1, the general configuration of a terrestrial digital television broadcasting system S will be described. FIG. 1 is a block diagram showing the general configuration of a terrestrial digital television broadcasting system.

In the terrestrial digital television broadcasting system S, a number of television stations TSs individually transmit their digital broadcast signals DSs to a television tower TT, which in turn terrestrially broadcasts the digital broadcast signals. In the terrestrial digital television broadcasting system S, each digital television broadcast receiving apparatuses 1 receives a digital broadcast signal DS broadcast from the television towers TT. In addition, in the terrestrial digital television broadcasting system S, each digital television broadcast receiving apparatus 1 is connected with a management center CS via the Internet using a telephone circuit in order to exchange information concerning the terrestrial digital television broadcast. Although not illustrated in the figure, each digital television broadcast receiving apparatus 1 which receives digital broadcast signals DSs from the television towers TT in the terrestrial digital television broadcasting system S may be either a fixed unit set up in a home or the like, a mobile unit mounted on a movable body, such as a train or ship, or an embedded unit integrated as a feature into a portable telephone or the like.

The television station TS, the digital television broadcast receiving apparatus 1 and the Internet IN using a telephone circuit in this embodiment represent examples, respectively, of the "broadcasting station", "digital broadcast receiving apparatus" and "non-broadcast communication medium" as set forth in the appended claims.

Figure 2B:
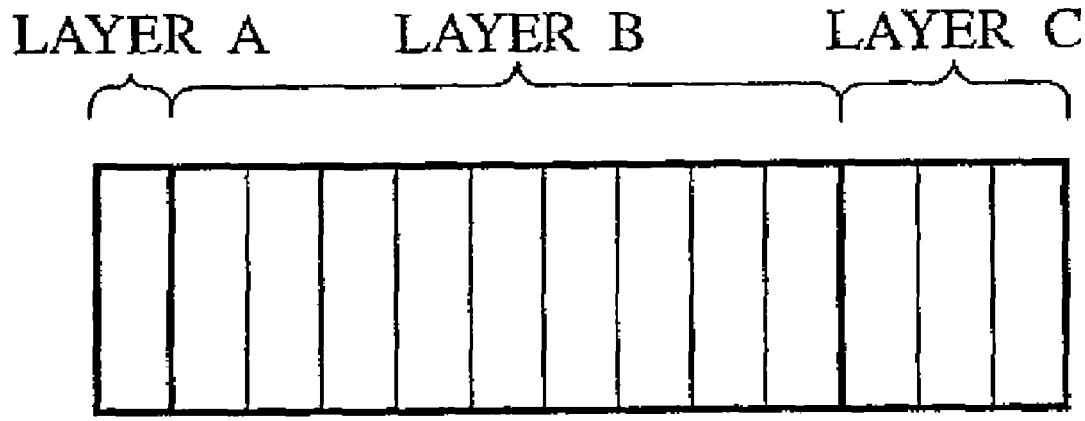
FIG. 2B is a diagram showing another example in which the transmission bandwidth is divided into (1+9+3) segments.
Figure 3:
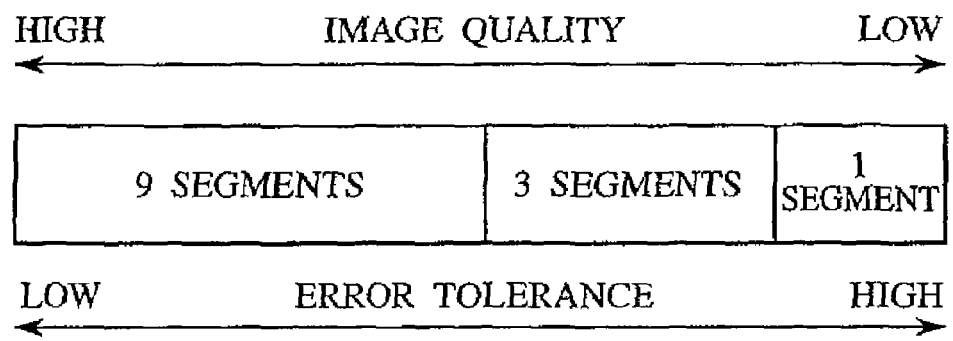
FIG. 3 is a diagram, using the (1+9+3) segment division as an example, which shows the relations between the number of segments, and the image quality and the error tolerance.
Figure 4:
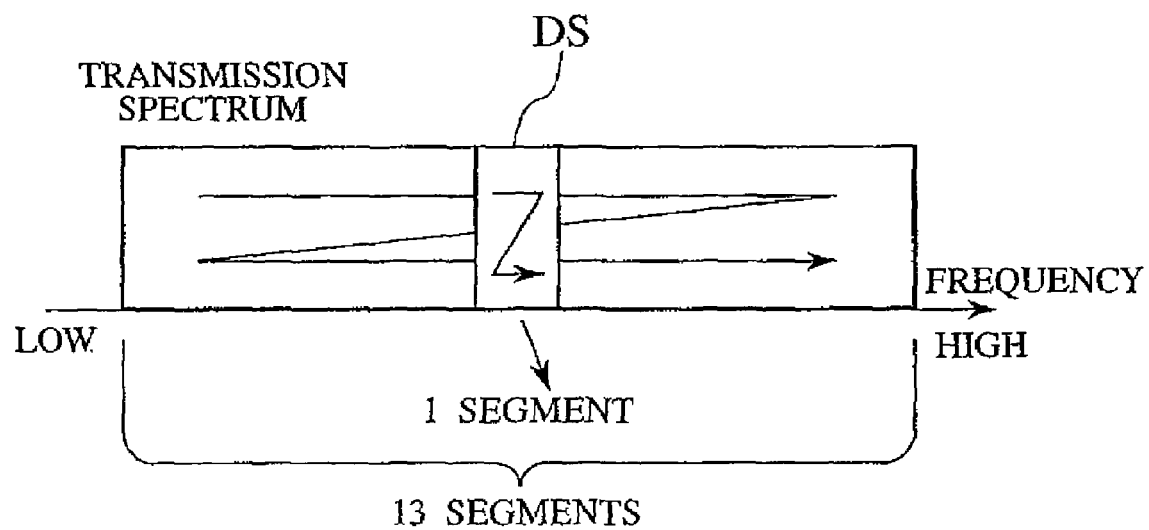
FIG. 4 is a diagram illustrating how the transmission spectrum of a digital broadcast signal is received.
Figure 5:
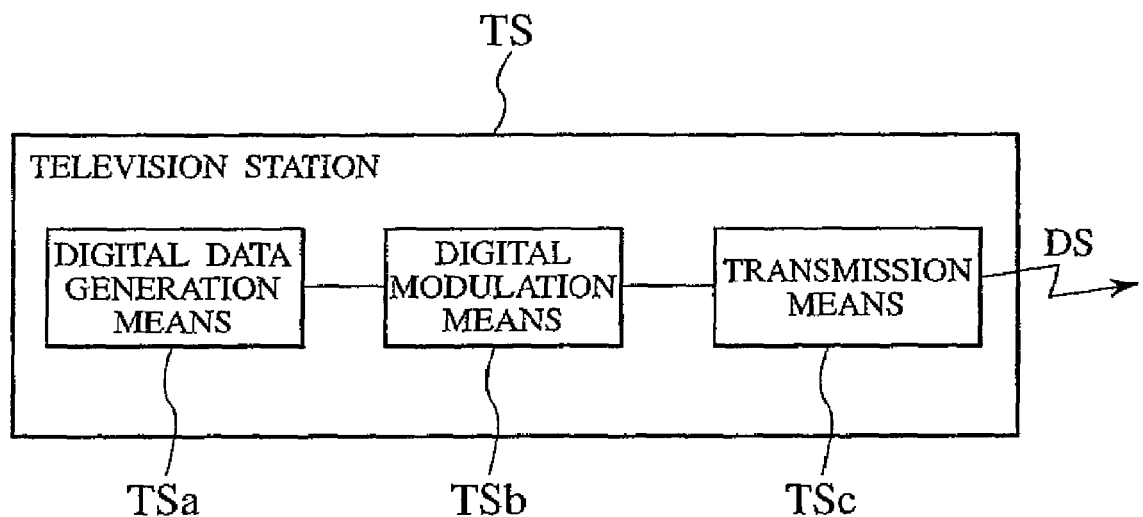
FIG. 5 is a block diagram of a television station according to the embodiment.
Figure 6:
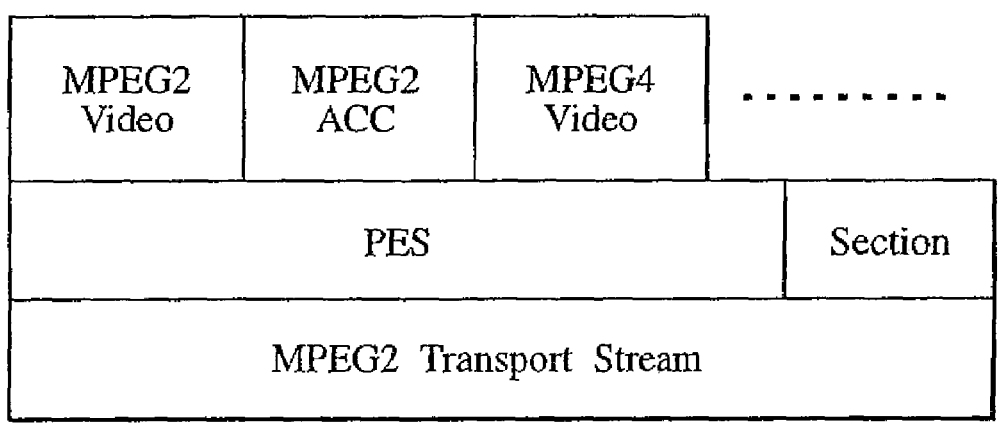
FIG. 6 is a diagram illustrating an MPEG2 TS constructed to generate a digital broadcast signal.

With reference to FIGS. 1 through 6, the television station TS will be described in more detail. FIGS. 2A and 2B show examples of the division of the segments. The segments are divided into (1+12) segments in FIG. 2A, while they are divided into (1+9+3) segments in FIG. 2B. Using the (1+9+3) division as an example, FIG. 3 shows the relations between the number of segments, and the image quality and the error tolerance. FIG. 4 illustrates how the transmission spectrum of a digital broadcast signal is received. FIG. 5 shows an example of the configuration of a television station. FIG. 6 is a diagram showing an MPEG2 TS constructed to generate a digital broadcast signal.

Being assigned one channel having a transmission bandwidth of several MHz, a television station TS provides dramas, sports, variety shows, news and other various fee-charging television programs. To provide a television program, each television station TS generates a digital broadcast signal DS containing the television program and transmits this digital broadcast signal DS to the television tower TT.

To provide services optimized for fixed reception, mobile reception, portable reception, etc., each television station TS broadcasts the same television program content in one to three layers having broadcasting formats which are set separately from each other. Therefore, each digital television broadcast receiving apparatus 1, after selecting a channel assigned to a television station TS, can output the same television program content from any of the one to three layers.

To collect television program supply fees (reception fees) from the users, each television station TS enters into a money collection contract with a company operating the management center CS. Based on the audience ratings of television program contents by layer, each television station TS receives supply fees from the company on a monthly basis. To notify the users of a broadcasting format of each layer, each television station TS also provides the broadcasting format information center OS of the management center CS with information about the broadcasting format of each layer (See FIG. 7). In addition to the television program supply fees, the operational revenues of each television station TS include advertisement fees from companies which present commercials as part of the television program contents. Each television station TS enters into advertisement contracts with companies who offer commercials for each of the television program contents. In these contracts, the advertisement fees are determined based on the audience ratings by layer. They may be arranged in such a manner that higher advertisement fees are paid if a layer consisting of fewer segments shows higher audience ratings than a wider layer, since a narrower layer has a higher error tolerance or a lower possibility of image/sound discontinuity, including a higher possibility of allowing the viewer to watch commercials, resulting in a higher advertisement benefit.

With reference to FIGS. 2A, 2B, 3 and 4, the layers will be described in more detail.

Taking into consideration the image/sound quality and error tolerance when the digital broadcast signal DS is received, each layer is designed for either reception by a fixed digital television broadcast receiving apparatus, reception by units mounted in automobiles and other movable bodies, or reception by units integrated into portable telephones. Each layer consists of some of the thirteen segments obtained by uniformly dividing an assigned transmission bandwidth. The number of layers and the number of segments constituting a layer may vary depending on each television station TS. For example, as seen in FIG. 2A, hierarchical transmission is effected in two layers, layer A consisting of one segment and layer B consisting of twelve segments. In FIG. 2B, hierarchical transmission is performed by three layers, layer A consisting of one segment, layer B consisting of nine segments and layer C consisting of three segments.

Due to the uniform division, each segment can transmit the same amount of data. Accordingly, as shown in FIG. 3, a layer consisting of more segments allows the target quality of television program contents to be set higher, since it can transmit enough data to display more pixels and more gradations per pixel. For a layer consisting of many segments, quality-oriented parameter setting is provided for its broadcasting format since such a layer assumes reception by fixed receiving apparatuses under good reception conditions. On the other hand, as shown in FIG. 3, a layer consisting of fewer segments exhibits lower data error rates and, therefore, higher error tolerance, since the amount of data transmitted is smaller. For a layer consisting of few segments, error tolerance-oriented parameter setting is provided for its broadcasting format, since such a layer assumes reception by movable bodies under unstable reception conditions.

In the terrestrial digital television broadcasting system S, OFDM is adopted as the modulation method and signals are modulated by OFDM on a segment-by-segment basis. Therefore, as shown in FIG. 4, a digital television broadcast receiving apparatus can be configured so as to receive either all thirteen segments or only one segment of each digital broadcast signal DS. The digital television broadcast receiving apparatus 1 in this embodiment is configured so that all of the thirteen segments can be received. By the way, the digital broadcast signal DS is received by scanning the transmission spectrum from the lower frequency side to the higher frequency side.

The broadcasting formats will be described below.

The broadcasting format of a layer is determined by taking into consideration whether the layer is targeted for fixed reception, movable reception or portable reception. There are parameters which determine the mode, carrier modulation method, guard interval and error correction inner code.

Taking into consideration the suitability to the station-to-station distance in the SFN (Single Frequency Network) and the Doppler shift tolerance in movable reception, the mode is selected from mode 1 (4 kHz), mode 2 (2 kHz) and mode 3 (1 kHz) listed in the descending order of Doppler tolerance (OFDM carrier interval). Widening the OFDM carrier interval increases tolerance to the Doppler effect in movable reception, but shortens the guard interval as well as the effective symbol length, resulting in reduced tolerance to ghosts.

The carrier modulation method is selectable from DQPSK (Differential Quaternary Phase Shift Keying), QPSK (Quaternary Phase Shift Keying), 16 QAM (Quadrature Amplitude Modulation) and 64 QAM. They are listed in the descending order of error tolerance (ascending order of transmission capacity) since applying much data to one carrier increases the possibility that errors occur in the digital data. To reduce the occurrence of information errors in movable reception involving fluctuations of the field strength, the selected modulation method must be error tolerant, although such a method is inferior in the quality of the broadcast due to the small amount of data.

The guard interval is selectable from $\frac{1}{4}$, $\frac{1}{8}$, $\frac{1}{16}$ and $\frac{1}{32}$, which are expressed as the ratios to the effective length of a symbol, which is each carrier's data transmission unit, and they are listed in the descending order of ghost tolerance. Ghosts due to reflected waves can be suppressed by lengthening the guard interval, although this reduces the data amount and therefore deteriorates the quality. The error correction inner code is a convolutional code selectable from $\frac{1}{2}$, $\frac{2}{3}$, $\frac{3}{4}$, $\frac{5}{6}$ and $\frac{7}{8}$.

With reference to FIG. 5, the configuration of a television station ST will be described. To generate and transmit a digital broadcast signal DS, the television station TS is provided with digital data generation means TSa, digital modulation means TSb and transmission means TSc. In addition, to notify the broadcasting format information center OS (See FIG. 7) in the management center CS of the broadcasting format of each layer via the Internet IN (See FIG. 1), the television station TS may be provided with a personal computer (not shown in the figure) for communication via the Internet IN.

With reference to FIGS. 5 and 6, the digital data generation means TSa will be described in more detail. In the digital data generation means TSa, image data picked up by a digital camera (not shown in the figure) and sound data are converted to a TS (Transport Stream) according to MPEG (Moving Picture Experts Group) 2 Systems and output to the digital modulation means TSb. First, in the digital data generation means TSa, the image data is compressed/coded according to the MPEG2 Video standard, and particularly for the portable reception layer, according to the MPEG4 Video standard. In the digital data generation means TSa, the sound data is compressed/coded according to the MPEG2 ACC (Advanced Audio Coding) standard. Further in the digital data generation means TSa, the coded image data and sound data are divided and placed in a PES (Packetized Elementary Stream). In the digital data generation means TSa, information necessary to decode the MPEG2 TS, information indicating television program contents and other information are placed in a Section. The digital generation means TSa generates a MPEG2 TS by multiplexing the PES and the Selection.

With reference to FIG. 5, the digital modulation means TSb will be described in more detail. The digital modulation means TSb generates a digital broadcast signal D from a large number of MPEG2 TSs and outputs it to the transmission means TSc. In the digital modulation means TSb, as many MPEG2 TSs as there are layers set in the television station TS are processed concurrently. In this concurrent processing, guard interval setting, mode setting, error correction coding, carrier modulation, frequency interleaving, time interleaving, etc. are performed according to the parameter settings established for each layer on a segment-by-segment basis and control information, such as TMCC (Transmission Multiplexing Configuration Control) and a pilot signal for synchronous reproduction, are added. Then, the thirteen segments of all layers processed concurrently are altogether converted to OFDM signals by IFFT (Inverse Fast Fourier Transform) to generate the digital broadcast signal DS.

With reference to FIG. 5, the transmission means TSc will be described. The transmission means TSc transmits the digital broadcast signal DS to a television tower TT (See FIG. 1) from a transmission antenna (not shown in the figure).

With reference to FIGS. 1 and 7, the configuration of the management center CS will be described. FIG. 7 shows the configuration of the management center.

The management center CS represents facilities which are operated by a company independent of any television station TS, which company is and in charge of management of information and money flows in the terrestrial digital television broadcasting system S. Accordingly the management center CS has a fee accounting center IS, an audience rating management center RS and a broadcasting format information center OS.

The company operating the management center CS has entered into a money collection contract with each television station TS and pays supply fees to each television station TS on a monthly basis according to the audience ratings surveyed by television program content and by layer. The company operating the management center CS has entered into a fee accounting contract with each user and collects money from the users for the reception of terrestrial digital television broadcasts on a monthly basis. By the way, the fee accounting contract may prescribe whether the user's fee accounting information can be used in calculation of the audience ratings or not. The company operating the management center CS has entered into an information supply contract with each user to notify the user of the broadcasting format, for each layer, of each television station TS and, therefore, collects an information supply fee from the user on a monthly basis. By the way, the operational revenues of the company are obtained mainly by a fee accounting service (=reception fee–supply fee) and an information supply service.

Note that the fee accounting center IS represents an example of a "center in charge of fee accounting for digital broadcasts" set forth in the appended claims.

With reference to FIGS. 1 and 7, the fee accounting center IS will be described in more detail. From each digital television broadcast receiving apparatus 1, the fee accounting center IS receives fee accounting information 26a (See FIG. 17) via the Internet IN on a daily basis. The fee accounting center IS calculates a monthly reception fee to be billed for each digital television broadcast receiving apparatus 1 based on the fee accounting information 26a and collects the reception fee from the user of each digital television broadcast receiving apparatus 1. For this purpose, the fee accounting center IS is provided with a fee accounting server (not shown in the figure) and a fee accounting information database (not shown in the figure).

In terms of hardware, the fee accounting server consists mainly of a main control unit, a storage unit, an input output unit and a communication control unit, which are interconnected via a bus. The fee accounting information database is configured as part of the storage unit. The main control unit consists mainly of an MPU (Micro Processing Unit) and a RAM (Random Access Memory) and governs or controls the fee accounting server. Further, the main control unit is provided with a WWW (World Wide Web) server program. The WWW server program is a communication platform program for communication by HTTP (Hyper Text Transfer Protocol). If the fee accounting server is connected to the Internet IN, the WWW server program is loaded into the RAM and executed by the MPU. The storage unit consists of a hard disk drive, a magnetic-optical disk drive, etc., and it stores various programs for the fee accounting server and the fee accounting information database. The input output unit consists of a keyboard, a mouse, a display, a CD-ROM driver, etc., and it is connected via an I/O unit. The communication control unit consists of a modem, etc. and implements information exchange via the Internet IN.

From each digital television broadcast receiving apparatus 1, the fee accounting server receives fee accounting information 26a via the Internet IN on a daily basis and stores the information in the fee accounting information database (See FIG. 17). At the end of each month, the fee accounting server reads out all fee accounting information 26a received in that month from the digital television broadcast receiving apparatus 1 and calculates a monthly reception fee to be billed for the digital television broadcast receiving apparatus 1 based on, for example, the total reception time of each layer determined from the fee accounting information 26a according to the fee accounting contract. By the way, the fee accounting contract may be arranged in such a manner that a fixed fee, not depending on reception time, is set with a discount rate for a narrow layer of a few segments, and the monthly bill is calculated by reducing the fixed fee proportionally to the total reception time of the narrow layer; or, a lower per minute reception fee is set for a narrower layer and the monthly bill is calculated by adding up the total reception time of each layer multiplied by the per minute reception fee. Setting discount terms or lower reception fees to narrow layers, like this, is reasonable in view of the advertisement effect. This is because a narrower layer of a few segments exhibits a higher error tolerance or lower image/sound discontinuity possibility, and, therefore, commercials inserted between television program contents are watched by the user more surely.

With reference to FIGS. 1 and 7, the audience rating management center RS will be described in more detail. The audience rating management center RS reads out fee accounting information 26a (See FIG. 17) via the fee accounting server in the fee accounting center IS and, based on the fee accounting information 26a, it calculates the audience rating of a television program content of each television station TS by layer. In addition, from positional information, field strengths and image states included in the fee accounting information 26a, the audience rating management center RS infers where reception conditions are bad. For this purpose, the audience rating management center RS is provided with an audience rating management server (not shown in the figure) and an audience rating database (not shown in the figure). The hardware configuration of the audience rating management server is similar to that of the fee accounting server. The audience rating database is configured as part of the storage unit of the audience rating management server.

On a daily basis, the audience management server calculates the audience rating of each television program content by layer based on the reception channel, layer and time records in the fee accounting information 26a, and it stores the results in the audience rating database. By the way, the television program content supply fees to be paid respectively to the television stations TSs are calculated by using this audience rating of each television program surveyed by layer. In addition, from the reception layer, latitude, longitude, field strength, image state and time records in the fee accounting information 26a, the audience rating management server infers where reception conditions are bad by channel and by layer (or where fading occurs by frequency interference). By the way, this information about where reception conditions are bad is supplied to each television station TS, which in turn moves the bad reception area to a mountain, a sea area or the like where the digital television signal DS is probably not received, by modifying broadcasting format parameters based on the supplied information.

With reference to FIGS. 1 and 7, the broadcasting format information center OS will be described in more detail. The broadcasting format information center OS stores a broadcasting format of each layer reported from each television station TS in a database, and it informs each digital television broadcast receiving apparatus 1 of the broadcasting format of each layer via the Internet IN. For this purpose, the broadcasting format information center OS is provided with a broadcasting format information server (not shown) and a broadcasting format information database (not shown). The hardware configuration of the broadcasting format information server is similar to that of the fee accounting server mentioned above. The broadcasting format information database is configured as part of the broadcasting format information server.

The broadcasting format information server sends a channel-to-broadcasting-format-correspondence table to digital television broadcast receiving apparatuses 1 via the Internet IN periodically (for example, once a day or once a week), or each time a television station TS changes the broadcasting format of a layer, or a request is made from the user side (a digital television broadcast receiving apparatus 1)(See FIG. 9). By the way, the information supply contract may be written in such a manner that a fixed value is set as the monthly fee or a per transmission fee is set for the channel-broadcasting-format table, and the monthly fee is calculated by multiplying the per transmission fee by the number of times the table is transmitted.

Figure 10:
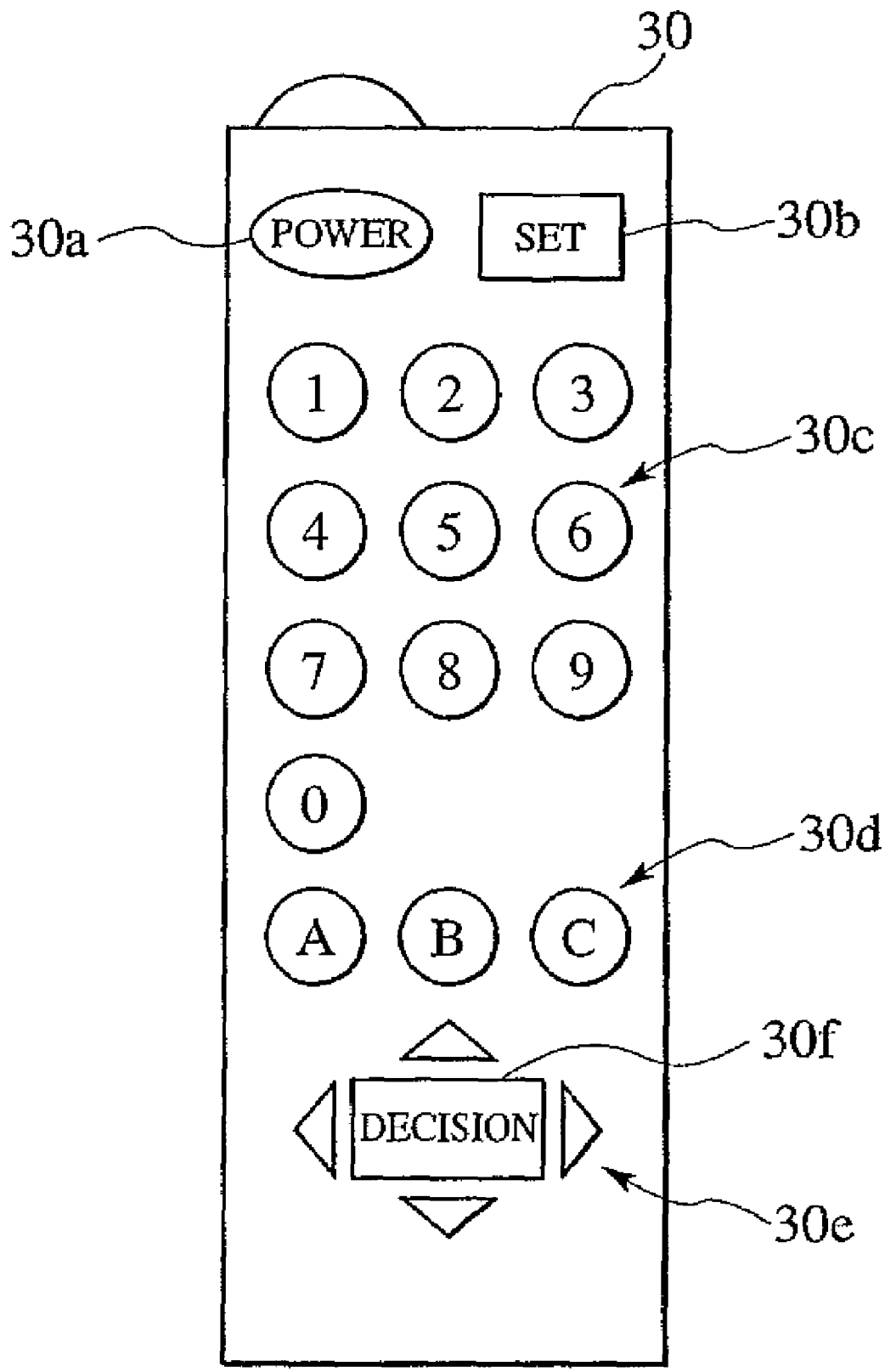
FIG. 10 is a plan view of a remote controller of the digital television broadcast receiving apparatus according to the invention.
Figure 11:
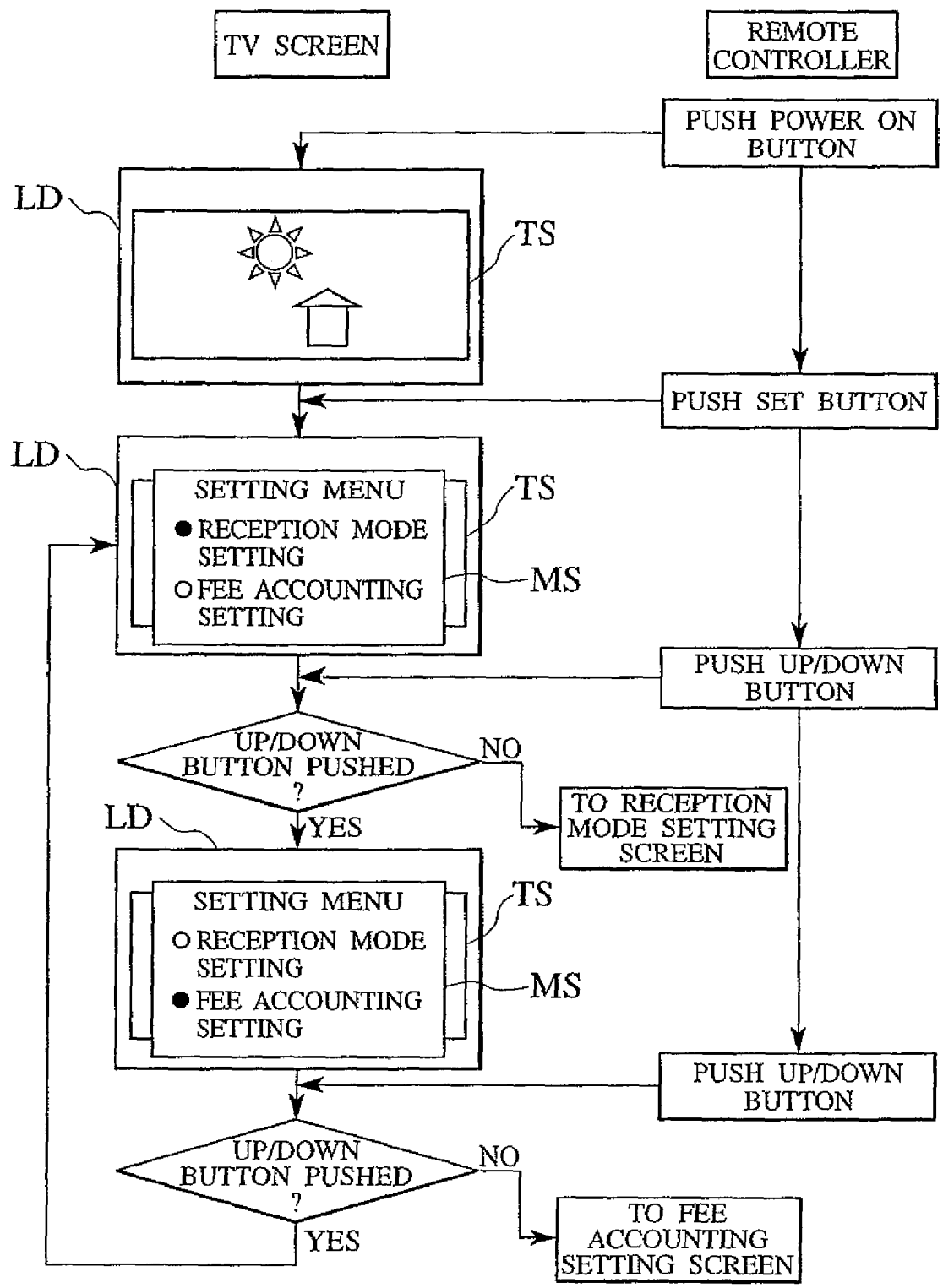
FIG. 11 is a flow diagram showing how settings are established by the user for the digital television broadcast receiving apparatus according to the invention.

With reference to FIGS. 8 through 17, the digital television broadcast receiving apparatus 1 will be described. FIG. 8 shows an example of the configuration of the digital television broadcast receiving apparatus. FIGS. 9A and 9B show channel-broadcasting-format-correspondence tables. FIGS. 9A and 9B respectively show a channel-broadcasting-format-code-correspondence table and a broadcasting-format table sorted by broadcasting format code. FIG. 10 is a view of a remote controller of the digital television broadcast receiving apparatus. FIG. 11 illustrates the procedure performed by the user to display setting screens of the digital television broadcast receiving apparatus. FIG. 12 shows a reception mode setting screen of the digital television broadcast receiving apparatus. FIG. 13 shows a fee accounting setting screen of the digital television broadcast receiving apparatus. FIG. 14 is a diagram showing how the field strength of a received digital broadcast signal is detected. FIG. 15A is a diagram showing an image quality detection method for a good quality image, and FIG. 15B shows a bad quality image. FIGS. 16A to 16D show how reception conditions are indicated by the digital television receiving apparatus, in which FIG. 16A shows a screen displayed when a 3-segment layer is normally received, FIG. 16B shows a screen displayed when the 3-segment layer is abnormally received, FIG. 16C shows a screen displayed when layers are searched for reception, and FIG. 16D shows a screen displayed after a 1-segment layer is selected. FIG. 17 shows an example of the data configuration of fee accounting information.

The digital television broadcast receiving apparatus 1, mounted on an automobile, outputs television program image/sound contents according to the channel and layer selected by the user. The digital television broadcast receiving apparatus 1 constantly has its own position changed as it receives the digital broadcast signal DS while the automobile moves. Therefore, the field strength, image quality and other reception conditions are subject to change. In addition, the digital television broadcast receiving apparatus 1 can receive all layers contained in the digital broadcast signal DS and can automatically select a layer according to the user's setting. By the way, the automobile on which the digital broadcast receiving apparatus 1 is mounted is also provided with a navigation device.

The automobile mentioned in connection with this embodiment is an example of a "movable body" as set forth in the appended claims.

With reference to FIG. 8, the configuration of the digital television broadcast receiving apparatus 1 will be described in more detail.

The digital television broadcast receiving apparatus 1 consists mainly of communication means 10, a channel-to-broadcasting-format-corresponding-table database 11, operation signal reception means 12, user setting means 13, set information retention means 14, segment reception means 15, segment reception condition detection means 16, segment reception condition history retention means 17, layer switching means 18, decode means 19, image condition detection means 20, image condition history retention means 21, output means 22, reproduction layer report means 23, switching rule generation means 24, fee accounting setting means 25 and switching history retention means 26. Accordingly, as for hardware, the digital television broadcast receiving apparatus 1 is provided with a CPU (Central Processing Unit), various storage devices, various input output devices, a communication control device, various electronic circuits, a reception antenna, a liquid crystal display, speakers, amplifiers, etc.

The communication means 10 in this embodiment is an example of the "communication means" set forth in the appended claims. Likewise, the channel-to-broadcasting-format-correspondence-table database 11 is an example of the recited "broadcasting format retention means"; the segment reception condition detection means 16 is an example of the "field strength detection means"; the layer switching means 18 is an example of the recited "switching means"; image condition detection means 20 is an example of the recited "reproduction condition detection means"; the switching rule generation means 24 is an example of the recited "layer decision means"; the switching history retention means 26 is an example of the recited "history retention means"; the user setting means 13 and the output means 22 is an example of the recited "setting screen supply means"; and the reproduction layer report means 23 and the output means 22 is an example of the recited "layer information display means".

With reference to FIG. 8, the communication means 10 will be described in more detail. The communication means 10 operates as means for exchanging information with the management center CS via the Internet IN. For this purpose, the communication means 10 is provided with not only a communication control device, such as a modem, but also a WWW browser for connection to a variety of servers (WWW servers, etc.) existing on the Internet IN. Connected to the fee accounting server of the fee accounting center IS via the Internet IN (See FIG. 7) at 0 a.m. every day, the communication server 10 transmits the fee accounting information 26a (See FIG. 17) retained in the switching history retention means 26. Also connected to the broadcasting format information server of the broadcasting format information center OS via the Internet IN, the communication means 10 receives a channel-to-broadcasting-format-correspondence table (See FIG. 9) and stores the channel-to-broadcasting-format-correspondence-table into the channel-to-broadcasting-format-correspondence-table database 11.

With reference to FIGS. 8 and 9, the channel-to-broadcasting-format-correspondence-table database 11 will be described in more detail. The channel-to-broadcasting-format-correspondence table database 11 is a database where the broadcasting format of each television station TS (each channel) is stored. Accordingly, the channel-to-broadcasting-format-correspondence-table database 11 has a channel-to-broadcasting-format-code-correspondence table 11a and a broadcasting-format-correspondence table 11b configured in a storage device, such as a hard disk. As shown in FIG. 9A, the channel-to-broadcasting-format-code-correspondence table 11a is a table where the channel assigned to each television station TS is associated with a unique number, a broadcasting format code, covering the channels of all television stations TSs constituting the terrestrial digital television broadcasting system S. As shown in FIG. 9B, the broadcasting-format-correspondence table 11b is a table where broadcasting formats are defined by broadcasting format code (that is, by television station TS) as to the number of layers and the type, mode, carrier modulation method, guard interval, error correction inner code and the number of segments of each layer, covering the broadcasting formats of all television stations TSs constituting the terrestrial digital television broadcasting system S.

With reference to FIGS. 8 and 10, the operation signal reception means 12 will be described in more detail. The operation signal reception means 12 operates as means for receiving an operation signal from the remote controller 30. Accordingly, the operation signal reception means 12 has an infrared sensor section, a reception circuit, etc. An infrared operation signal is emitted from the remote controller 30 when the corresponding button is pushed. Upon receiving the operation signal, the operation signal reception means 12 converts the signal into an operation code. Each button on the remote controller 30 is assigned an operation code. By the way, the remote controller 30 is provided with a power button 30a, setting buttons 30b used to go to setting screens, setting buttons 30c used to select channels, alphabetic buttons 30d used to select layers, four direction buttons 30e used to move within setting screens, a decision button 30f used to make a decision within setting screens and others.

With reference to FIGS. 8, 10, 11, 12 and 13, the user setting means 13 will be described. The user setting means 13 allows the user to set layer switching principles which are to be used in the digital television broadcast receiving apparatus 1 for automatic layer switching. Accordingly, to perform user setting processing, the user setting means 13 has various screen data stored in a storage device such as a VRAM (Video RA) or hard disk, so that the user setting program can be executed by the CPU.

Referring to FIG. 11, the transition of the setting menu screen MS will be described. If the setting button 30b is pushed when the television screen TS is displayed on the liquid crystal display LD of the output means 22, the user setting means 13 receives the corresponding operation code via the operation signal reception means 12 and displays the setting menu screen MS on the television screen TS. The setting menu screen MS allows the user to choose from reception mode setting and fee accounting setting. If the up or down button 30e is pressed when the setting menu screen MS is displayed, the user setting means 13 receives the corresponding operation code via the operation signal reception means 12 and lets the selection toggle between the reception mode setting and the fee accounting setting. If the decision button 30e is pressed when either reception mode setting or fee accounting setting is selected in the setting menu screen MS, the user setting means 13 receives the corresponding operation code via the operation signal reception means 12 and replaces the setting menu screen MS by the reception mode setting screen WS or the fee accounting setting screen FS.

The reception mode setting screen WS shown in FIG. 12 will be described. The reception mode setting screen is a screen for setting a switching principle for reception condition-based automatic layer switching, allowing the user to specify whether layer switching is to be effected based on the image quality, wave condition or both the image quality and the wave condition. If the up or down button 30e is pushed when the reception mode setting screen WS is displayed, the user setting means 13 receives the corresponding operation code via the operation signal reception means 12 and lets the selection move among the three switching modes. If the decision button 30f is pushed when one of the three switching principles is selected in the reception mode setting screen WS, the user setting means 13 receives the corresponding operation code via the operation signal reception means 12, confirms the switching principle and stores it in the set information retention means 14. The setting established through the reception mode setting screen WS is made invalid if image quality oriented layer selection has been set by the fee accounting setting screen FS (See FIG. 13). By the way, the user setting means 13 may be designed in such a manner that if "Both Image Quality and Wave Condition Considered" is selected, a scale bar is displayed to allow the user to specify how much priority is to be given to the image quality or the wave condition.

The fee accounting setting screen FS, shown in FIG. 13, will be described. The fee accounting setting screen FS is a screen for setting an accounting scheme as the layer selection principle for automatic layer selection, allowing the user to specify whether to use the image quality oriented accounting scheme or the continuity oriented accounting scheme for layer selection. If the up or down button 30e is pushed when the fee accounting setting screen FS is displayed, the user setting means 13 receives the corresponding operation code via the operation signal reception means 12 and lets the selection toggle between the two selection principles mentioned above. And, if the decision button 30f is pushed when one of the two selection principles is selected in the fee accounting setting screen FS, the user setting means 13 receives the corresponding operation code via the operation signal reception means 12, confirms the selection principle and stores it in the set information retention means 14.

With reference to FIG. 8, the set information retention means 14 will be described. The set information retention means 14 operates as means for storing information set by the user. The set information retention means 14 is provided with a storage device, such as a SRAM Static Ram. The set information retention means 14 memorizes not only the information set through the reception mode setting screen WS and the fee accounting setting screen FS, but also the channel, layer, sound volume, etc. set by the user.

With reference to FIG. 8, the segment reception means 15 will be described. The segment reception means 15 operates as means for receiving a digital broadcast signal DS. The segment reception means 15 is provided with a reception antenna, a reception circuit, etc. The segment reception means 15 receives digital broadcast signal DS via the reception antenna and picks up the digital broadcast signal DS of the channel set by the user.

With reference to FIGS. 8 and 14, the segment reception condition detection means 16 will be described. As a measure of the wave condition of the received digital broadcast signal DS, the field strength of each layer of the currently output channel is measured by the segment reception condition detection means 16. Accordingly, the segment reception condition detection means 16 is provided with a field strength measurement circuit, etc. The segment reception condition detection means 16 measures the field strength of each layer of the digital broadcast signal DS that is picked up by the segment reception means 15, and it stores the measured field strength, in association with the measurement date/time, channel name and layer name, in the segment reception condition history retention means 17. By the way, the lowest field strength required to continuously output images and sound is set as a value of reference field strength in the digital television broadcast receiving apparatus 1. If the measured field strength falls below the reference field strength, layer switching is carried out (See FIG. 14).

With reference to FIG. 8, the segment reception condition history retention means 17 will be described.

The segment reception condition history retention means 17 operates as means for storing information detected by the segment reception condition detection means 16. Accordingly, the segment reception condition history retention means 17 has an area reserved in a storage device, such as a hard disk, for storing a segment reception condition history. The segment reception condition history retention means 17 stores the field strength for each layer of the digital broadcast signal DS measured by the segment reception condition detection means 16, including the measurement date/time, channel number, layer name, etc.

With reference to FIG. 8, the layer switching means 18 will be described. Of the digital broadcast signal DS of the channel selected by the user, the layer switching means 18 demodulates a layer that has been selected by the user or selected automatically to pick out MPEG2 TSs. Accordingly, the layer switching means 18 is provided with various demodulation circuits. First, the layer switching means 18 retrieves the broadcasting format correspondence table 11b (See FIG. 9) of the user selected channel from the channel-to-broadcasting-format-correspondence-table database 11, reads the mode, carrier modulation method, guard interval and inner code of the layer to be demodulated and sets them to various demodulation circuits as parameters. Then, in the layer switching means 18, guard interval removal processing, FFT processing, TMCC signal and pilot signal pick out processing, frequency de-interleave processing, time de-interleave processing and OFDM frame synchronization processing according to the set mode, modulation method and inner code are performed on each segment of the layer to be demodulated in the digital broadcast signal DS extracted in the segment reception means 15. As a result, the MPEG2 TSs of the layer are obtained. Note that the layer switching means 18, in some cases, demodulates another layer of the channel in addition to the selected layer and pick out MPEG2 TSs in order to detect the image condition of the layer.

With reference to FIG. 8, the decode means 19 will be described. The decode means 19 operates as means for decoding the MPEG2 TSs, demodulated by the layer switching means 18, to pick out image data and sound data. Accordingly, the decode means 19 is provided with various decoder circuits. In the decode means 19, coded image data and coded sound data are picked out from MPEG2 TSs. Further, the decode means 19 decodes encoded image data and encoded image data, respectively, to separate image data and separate sound data and combines them to generate image data and sound data which are later used to reproduce a television program content.

With reference to FIGS. 8 and 15, the image condition detection means 20 will be described.

Figure 15A:
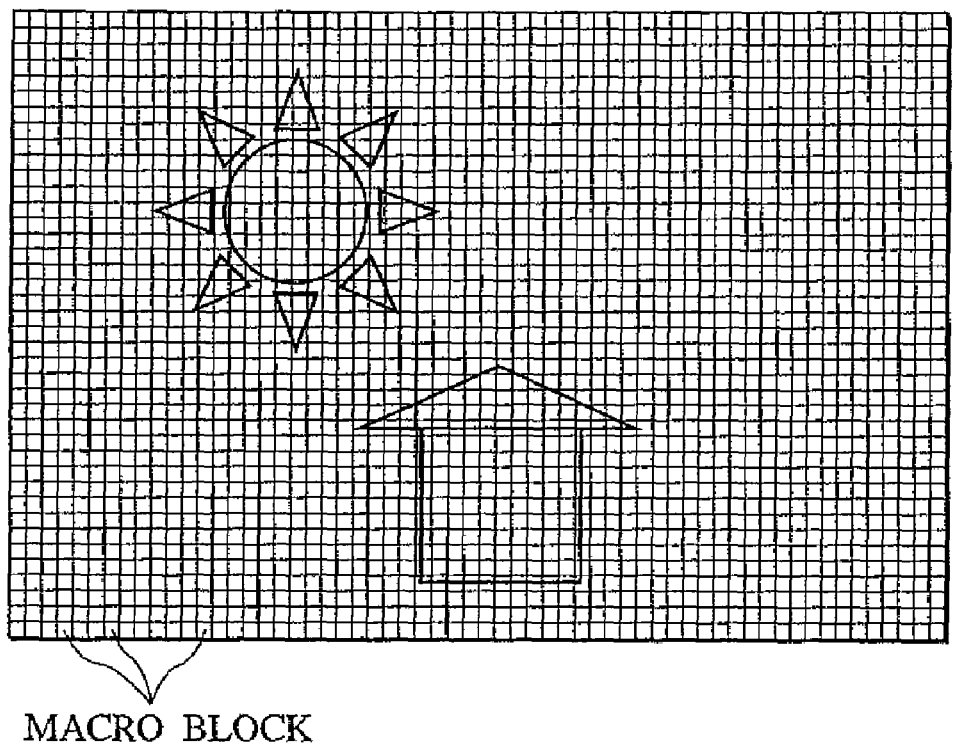
FIG. 15A is a diagram illustrating an image quality detection method, showing a good quality image.
Figure 15B:
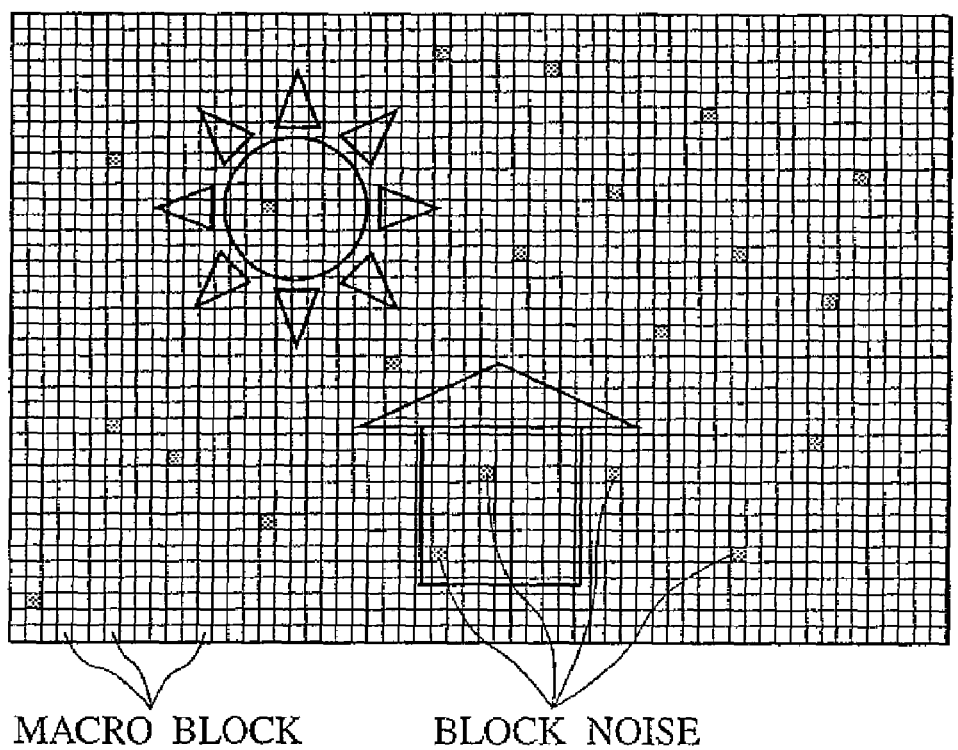
FIG. 15B is a diagram showing a bad quality image.

The image condition detection means 20 measures the image quality of each layer of the currently output channel, as image conditions (reproduction conditions). Accordingly, the image condition detection means 20 is provided with an image quality measurement circuit, etc. Based on the image data generated by the decode means 19, the image condition detection means 20 checks each macro block in one screen to judge whether the macro block is a block noise (cannot be reproduced as image) and to count the number of block noises per frame. Further, the image condition detection means 20 compares the number of block noises with a reference number. The image condition detection means 20 judges the image condition as being good if the number of block noises is not larger than the reference number. If it is larger than the reference number, the image condition detection means 20 judges the image condition as being bad. The image condition detection means 20 stores the number of block noises in association with the measurement date/time, channel number, layer name and image condition judgment in the image condition history retention means 21. In the digital television broadcast receiving apparatus 1, one frame is divided into macro blocks, each consisting of 16×16 pixels for image quality measurement, as shown in FIG. 15A, and each macro block is judged as being a block noise or not according to whether the macro block has normal data. The digital television broadcast receiving apparatus 1 switches the output to another layer if the number of detected block noises exceeds a reference number, which is set as the maximum allowable number of block noises in view of the image quality. Block noises are caused by fading, etc. in such a fashion that coded image data can not be decoded normally due to lack of information necessary for decoding, or coded image macro block data does not exist in the Huffman code table.

With reference to FIG. 8, the image condition history retention means 21 will be described. The image condition history retention means 21 operates as means for storing information detected by the image condition detection means 20. Accordingly, the image condition history retention means 21 has an area reserved in a storage device, such as a hard disk, for storing an image condition history. The image condition history retention means 21 stores the number of block noises measured by the image condition detection means 20, in association with the measurement date/time, reception channel number, layer name, image condition judgment, etc.

With reference to FIG. 8, the output means 22 will be described. The output means 22 operates as means for outputting image and sound data decoded by the decode means 19 as an image and sound, respectively. Accordingly, the output means 22 is provided with a liquid crystal display, a speaker, an amplifier, etc. The output means 22 not only outputs images on the liquid crystal display based on the image data, but also outputs sound from the speaker based on the sound data.

With reference to FIGS. 8 and 16A to 16D, the reproduction layer report means 23 will be described. The reproduction layer report means 23 operates as means for displaying information about the currently output layer and information about the ongoing automatic layer switching. Accordingly, the reproduction layer report means 23 has various display data stored in storage devices, such as a VRAM and a hard disk, so that the reproduction layer report program can be executed by the CPU. FIGS. 16A to 16D show a layer switching flow as an example of the reproduction layer report processing. In this case, the received channel has three layers: 1-segment, 3-segment and 9-segment layers; and, due to worsening reception conditions of the currently output 3-segment layer, the output layer is switched to the 1-segment layer.

In FIG. 16A, the output layer is received satisfactorily. In this case, the reproduction layer report layer 23 displays a normal reception layer bar GB1 in the highest area of the liquid display LD, a normal reception comment GC below the normal reception layer bar GB1 and a normal reception mark GM on the left side (as viewed toward the screen) of the normal reception layer bar GB1. A fixed-length rectangle is divided into three regions at a ratio of 9:3:1 to indicate the reception conditions of the 9-segment layer, the 3-segment layer or the 1-segment layer, and whether automatic layer switching is ongoing. In this figure, the normal reception layer bar GB1 is displayed in blue for the 3-segment layer. The designation "3 Segments being Received" is displayed as the normal reception comment GC, while a smiling face is schematically displayed as the normal reception mark GM.

In FIG. 16B, the reception condition of the output layer has worsened. In this case, the reproduction layer report means 23 displays an abnormal reception layer bar NB in the highest area of the liquid crystal display LD, an abnormal reception comment NC below the abnormal reception layer bar NB and an abnormal reception mark NM on the left side (as viewed toward the screen) of the abnormal reception layer bar NB. In the figure, the abnormal reception bar NB is displayed in red in the 3-segment layer region. In addition, the designation "3-Segment Reception Condition Worsened" is displayed as the abnormal reception comment NC, while a depressed face is schematically displayed as the NM.

In FIG. 16C, automatic layer switching is ongoing. In this case, the reproduction layer report means 23 displays a search bar CB in the highest area of the liquid crystal display LD, a search comment CC below the search bar CB and a search mark CM on the left side (as viewed toward the screen) of the search bar CB. In the figure, the search bar CB, occupying the whole rectangle, is blinking in yellow In addition, the designation "Segment being Searched for Reception" is displayed as the search comment CC, while a thinking face is schematically displayed as the CM.

In FIG. 16D, the output layer has been switched. In this case, the reproduction layer report means 23 displays a normal reception layer bar GB2 in the highest area of the liquid display LD, a switching comment SC below the normal reception layer bar GB2 and a normal reception mark GM on the left side (as viewing toward the screen) of the normal reception layer bar GB2. In this figure, the normal reception layer bar GB2 is displayed in blue for the 1-segment layer. In addition, the designation "1-Segment Layer Set for Reception" is displayed as the switching comment SC. Incidentally, it is usual that a normal reception layer bar such as GB2 and the normal reception mark GM are displayed as shown since the output is switched to a good reception condition layer in automatic layer switching.

With reference to FIG. 8, the switching rule generation means 24 will be described. The switching rule generation means 24 operates as means for determining which layer is to be output according to the switching principle selected by the user for reception condition-based automatic layer switching. Accordingly, the switching rule generation means 24 has various judgment values, etc. stored in a storage device such as a hard disk so that the switching rule generation program can be executed by the CPU.

By referring to the reception condition-based switching principle stored in the set information retention means 14, the switching rule generation means 24 judges whether layer switching is to be carried out based on the image quality, the wave condition or both the image quality and the wave condition, and it then performs processing according to the switching principle. If no switching principle is set, the switching rule generation means performs no processing.

The flow of processing performed when layer switching is to be carried out, based on the image quality, will now be described. From the image condition history retention means 21, the switching rule generation means 24 reads out the number of block noises detected in the currently output layer. Then, the switching rule generation means 24 compares the read number of block noises with the reference number (See FIG. 15). If the read number of block noises is not larger than the reference number, the switching rule generation means 24 continues outputting the current layer. If larger than the reference number, the switching rule generation means 24 begins the step of selecting a better image quality layer.

In the step of selecting a better image quality layer, the switching rule generation means 24 reads out the number of block noises detected in each of the layers not currently output from the image condition history retention means 21. Then, the switching rule generation means 24 compares all layers of the currently output channel in terms of the number of block noises and selects the most block noise-free layer as the next layer to be output.

The flow of processing performed when layer switching is to be carried out, based on the wave condition, will be described. From the segment condition history retention means 17, the switching rule generation means 24 reads out the field strength of the currently output layer. Then, the switching rule generation means 24 compares the read field strength with the reference field strength (See FIG. 14). If the field strength of the currently output layer is not lower than the reference field strength, the switching rule generation means 24 continues outputting the current layer. If it is lower than the reference field strength, the switching rule generation means 24 begins the step of selecting a better wave condition layer.

In the step of selecting a better wave condition layer, the switching rule generation means 24 reads out the field strength of each layer not currently output from the segment condition history retention means 17. Then, the switching rule generation means 24 compares all layers of the currently output channel in terms of field strength and selects the best wave condition layer as the next layer to be output.

The flow of processing performed when layer switching is to be carried out, based on both image quality and wave condition, will be described. First, the switching rule generation means 24 reads out the field strength of the currently output layer from the segment condition history retention means 17 and the number of block noises detected in the layer from the image condition history retention means 21. The switching rule generation means 24 calculates a differential field strength by subtracting a reference field strength from the read field strength. Then, the switching rule generation means 24 calculates an evaluation value by multiplying the read-out block noise count by $\alpha$, multiplying the differential field strength by $\beta$, and adding these two multiplied values. The switching rule generation means 24 compares the calculated evaluation value with a reference evaluation value. If the calculated evaluation value is not smaller than the reference evaluation value, the switching rule generation means 24 continues outputting the current layer. If it is smaller than the reference evaluation value, the switching rule generation means 24 begins the step of selecting a better image quality and wave condition layer. In view of both image quality and wave condition, the evaluation value quantitatively represents the reception condition. A larger evaluation value exhibits a better reception condition. The reference evaluation value represents the worst reception condition below which normal images and sound cannot be output. $\alpha$ and $\beta$ are weighting conversion factors which establish how much importance the image quality and the field strength are respectively given in the evaluation of the reception condition. They may be either variables determined by the user, or they may be designed to have such values that the same importance is given to both image quality and field strength.

In the step of selecting a better image quality and wave condition layer, the switching rule generation means 24 reads out the field strength of each layer not currently output from the segment condition history retention means 17 and also the number of block noises in each layer from the image condition history retention means 21. Then, the switching rule generation means 24 calculates the evaluation value of each layer other than the currently output layer in the same manner as described above. And, the switching rule generation means 24 compares all layers of the currently output channel in terms of the evaluation value and selects the most highly evaluated layer as the next layer to be output.

With reference to FIGS. 8 and 17, the fee accounting setting means 25 will be described. The fee accounting setting means 25 operates as means for not only selecting a layer for output based on the layer selection principle (accounting scheme) set by the user, but also provides setting fee accounting information 26a. Accordingly, the fee accounting setting means 25 has a fee accounting switching program and a fee accounting information setting program executed by the CPU.

By referring to the accounting-based layer selection principle stored in the set information retention means 14, the fee accounting setting means 25 judges whether to employ the image quality-oriented accounting scheme or continuity-oriented accounting scheme and then performs processing according to the selection principle. If no selection principle is set, the fee accounting setting means performs no processing.

The flow of processing performed when the continuity-oriented accounting scheme is selected will be described. By referring to the reception condition-based switching principle stored in the set information retention means 14, the accounting setting means 25 judges whether or not the reception condition-based switching principle is set. If a reception condition-based switching principle is set, the accounting setting means 25 leaves processing to the switching rule generation means 24, which was described earlier. If no reception condition-based switching principle is set, the accounting setting means 25 refers to the broadcasting format table 11b (see FIG. 9), corresponding to the channel set by the user, in the channel-to-broadcasting-format-correspondence-table database 11. Then, from the layers of the channel, the accounting setting means 25 selects a layer having the smallest number of segments.

The flow of processing performed when the image quality-oriented accounting scheme is selected will be described. By referring to the broadcasting format table 11b (See FIG. 9), corresponding to the channel set by the user, in the channel-to-broadcasting-format-correspondence-table database 11, the accounting setting means 25 selects a layer having the largest number of segments from the layers of the channel.

In addition, the fee accounting setting means 25 begins to set fee accounting information 26a (see FIG. 17) immediately after the reception of a terrestrial digital television broadcast is started. When reception is started or channel or layer switching is done, the fee accounting setting means 25 sets the newly received (output) channel and layer names to the fee accounting information 26a. The fee accounting setting means 25 also measures a period of time spent to receive the channel and layer and sets the reception period to the fee accounting information 26a. In addition, every ten minutes, the fee accounting setting means 25 obtains the current latitude and longitude of the automobile from the navigation device mentioned earlier, the field strength information from the segment reception condition history retention means 17, and the image condition information from the image condition history retention means 21, and it sets them to the fee accounting information 26a.

With reference to FIGS. 8 and 17, the switching history retention means 26 will be described. The switching history retention means 26 is means for storing the fee accounting information 26a. Accordingly, the switching history retention means 26 has an area reserved on a storage device, such as a hard disk. As shown in FIG. 17, the fee accounting information 26a has reception time information and periodically (every ten minutes) measured latitude, longitude, field strength and image condition information on a received channel/layer basis. The fee accounting information 26a is managed on a daily basis and is sent to the fee accounting center IS once a day.

According to this digital television broadcast receiving apparatus 1, it is possible to continuously output images and sound even when the field strength of the currently output layer weakens, since reception can automatically be switched to the best wave condition layer of the reception channel, if the field strength falls below the reference field strength. According to the digital television broadcast receiving apparatus 1, it is possible to minimize the deterioration of the image quality, since reception can automatically be switched to the best image condition layer of the channel if the number of block noises exceeds the reference count. In addition, according to the digital television broadcast receiving apparatus 1, it is possible to continuously output images and sound while suppressing the deterioration of the image quality, since the reception can be automatically switched to the best reception condition layer of the reception channel by considering both image quality and field strength. Furthermore, according to the digital television broadcast receiving apparatus 1, it is possible to always select the layer having the largest number of segments automatically from the layers of the reception channel.

With the digital television broadcast receiving apparatus 1, it is possible for the user to set a switching principle according to the situation by using the fee accounting setting screen FS and the reception mode setting screen WS. For example, when the user is in a mountainous area or an urban area surrounded by skyscrapers, wave condition-based switching is appropriate due to bad wave conditions. If the user is annoyed with flickers in the screen, image quality-based switching may be selected. If good wave conditions can be expected when the user's automobile is parked, the image quality-oriented accounting scheme may be appropriate.

With the digital television broadcast receiving apparatus 1, the user does not have to perform fee accounting-related operations, since the reception channel, reception layer and reception time information is periodically transmitted to the fee accounting center IS. According to the digital television broadcast receiving apparatus 1, if a television station TS changes its broadcasting format or a new television station TS is opened, it is possible to quickly cope with the new broadcasting format, since the broadcasting format of that television station TS is transmitted from the broadcasting format information center OS.

Figure 18:
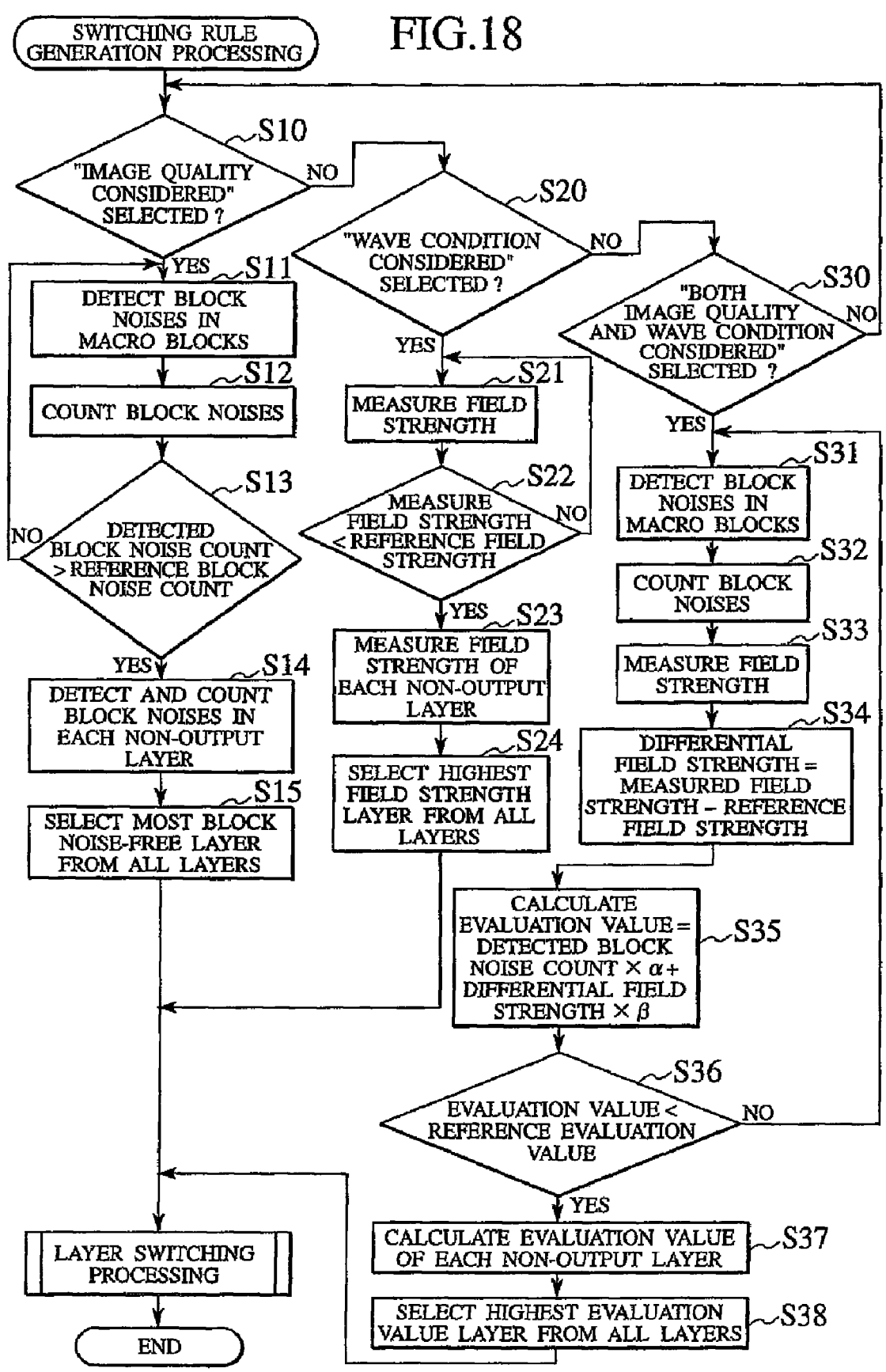
FIG. 18 is a flowchart of switching rule generation processing in the digital television broadcast receiving apparatus according to the invention.

With reference to FIGS. 8 and 17, the switching rule generation processing in the digital television broadcast receiving apparatus 1 will be described with further reference to the flowchart of FIG. 18. FIG. 18 is a flowchart of the switching rule generation processing performed by the digital television broadcast receiving apparatus 1.

The digital television broadcast receiving apparatus 1 judges whether or not "Image Quality Considered" is selected by the reception mode setting screen WS (S10) (see FIG. 12).

If "Image Quality Considered" is selected, the digital television broadcast receiving apparatus 1 examines each macro block in the currently output layer frame to detect block noises (S11) and counts the number of block noises per frame (S12). Then, the digital television broadcast receiving apparatus 1 judges whether the number of detected block noises per frame is larger than the reference block noise count (S13). If the number of detected block noises is not larger than the reference block noise count (that is, if the image quality is good), the digital television broadcast receiving apparatus 1 loops back to processing step S11.

Meanwhile, if the number of detected block noises is larger than the reference block noise count (that is, if the image quality has worsened), the digital television broadcast receiving apparatus 1 examines each macro block in the current frame of other layers of the same channel and counts the number of detected block noises per frame (S14). The digital television broadcast receiving apparatus 1 compares all layers of the currently received channel in the number of block noises per frame and selects the most block noise-free layer as the next layer to be output. For example, if layer C of channel 201 is being output, as shown in FIG. 9, block noises in layers A and B are respectively counted. Layers A, B and C are compared in terms of the number of block noises, and the most noise block-free layer is selected as the layer to be output.

Note that processing steps S11, S12 and S13 in this embodiment are an example of the "reproduction condition detection step" as set forth in the appended claims.

If "Image Quality Considered" is not selected, the digital television broadcast receiving apparatus 1 judges whether "Wave Condition Considered" is selected in the reception mode setting screen WS (S20) (see FIG. 12).

If "Wave Condition Considered" is selected, the digital television broadcast receiving apparatus 1 measures the field strength of the currently output layer (S21). Then, the digital television broadcast receiving apparatus 1 judges whether the measured field strength is smaller than the reference field strength (S22). If the measured field strength is not smaller than the reference field strength (that is, if the wave condition is good), the digital television broadcast receiving apparatus 1 loops back to processing step S21.

Meanwhile, if the measured field strength is smaller than the reference field strength (that is, if the wave condition has worsened), the digital television broadcast receiving apparatus 1 measures the field strength of other layers of the same channel (S23). The digital television broadcast receiving apparatus 1 compares all layers of the currently received channel in term of the field strength and selects a layer having the largest field strength as the next layer to be output. For example, if layer C of channel 201 is being output, as shown in FIG. 9, the field strength of each of the layers A and B is measured. Layers A, B and C are compared in terms of the field strength and a layer of the highest field strength is selected as the layer to be output Note that processing steps S21 and S23 in this embodiment are an example of the "field strength detection step" as set forth in the appended claims.

If "Wave Condition Considered" is not selected, the digital television broadcast receiving apparatus 1 judges whether "Both Image Quality and Wave Condition Considered" is selected in the reception mode setting screen WS (S30) (see FIG. 12). If "Both Image Quality and Wave Condition Considered" is not selected, the digital television broadcast receiving apparatus 1 loops back to processing step S10.

If "Both Image Quality and Wave Condition Considered" is selected, the digital television broadcast receiving apparatus 1 checks macro blocks of the currently output layer frame to detect block noises (S31) and counts the number of block noises per frame (S32). Subsequently, the digital television broadcast receiving apparatus 1 measures the field strength of the currently output layer (S33) and calculates a differential field strength (=Measured field strength—Reference field strength)(S34). Then, the digital television broadcast receiving apparatus 1 calculates an evaluation value (=Differential block noise count×α+Differential field strength×β) of the currently output layer (S35) and judges whether the calculated evaluation value is smaller than the reference evaluation value (S36). If the calculated evaluation value is not smaller than the reference evaluation value (that is, if the comprehensive reception condition calculated based on both image quality and wave condition is good), the digital television broadcast receiving apparatus 1 goes back to processing step S31.

Meanwhile the calculated evaluated value is smaller than the reference evaluation value (that is, if the comprehensive reception condition calculated based on both image quality and wave condition has worsened), the digital television broadcast receiving apparatus 1 calculates evaluation values of other layers of the same channel in the same manner as processing steps S31 through S35 (S37). The digital television broadcast receiving apparatus 1 compares all layers of the currently received channel in terms of the calculated evaluation value and selects the highest evaluation value layer as the next layer to be output (S38). For example, if layer C of channel 201 is being output, as shown in FIG. 9, the evaluation values of layers A and B are respectively calculated. Then, layers A, B and C are compared in terms of the evaluation value and the highest evaluation value layer is selected as the layer to be output.

Figure 19:
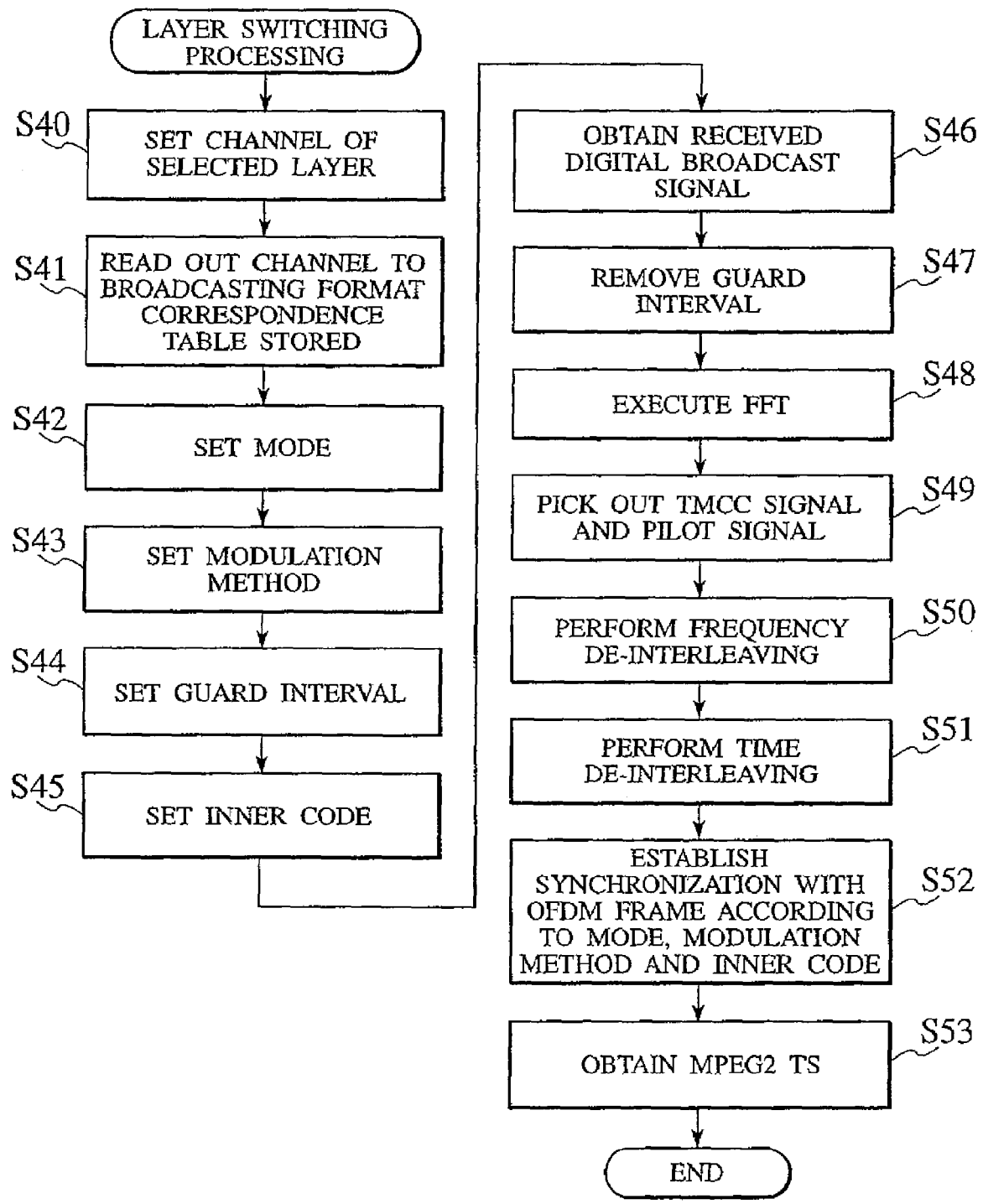
FIG. 19 is a flowchart of layer switching processing in the digital television broadcast receiving apparatus according to the invention.

After a layer is selected at step S15, S24 or S38, the digital television broadcast receiving apparatus 1 proceeds with the layer switching processing shown in FIG. 19.

Note that processing steps S15, S24 and S38 in this embodiment are an example of the "layer decision step" as set forth in the appended claims.

With reference to FIGS. 8 and 17, the layer switching processing in the digital television broadcast receiving apparatus 1 will be described with further reference to the flowchart of FIG. 19. FIG. 19 is a flowchart of the layer switching processing performed in the digital television broadcast receiving apparatus 1.

Figure 20:
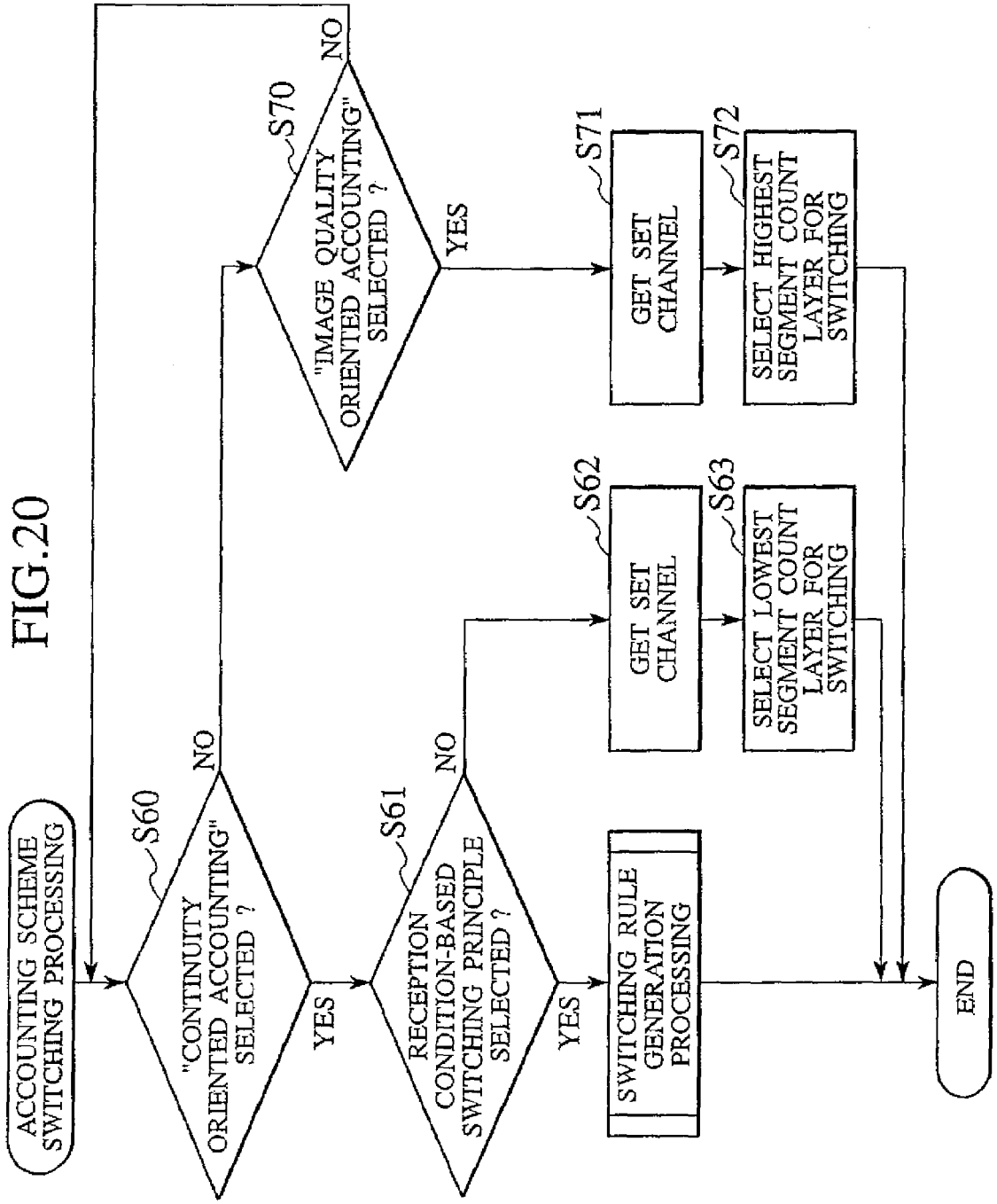
FIG. 20 is a flowchart of fee accounting switching processing in the digital television broadcast receiving apparatus according to the invention.

If a channel and/or a layer is selected by the user or if a layer is selected by the switching rule generation processing shown in FIG. 18 or by the accounting scheme switching processing in FIG. 20, the digital television broadcast receiving apparatus 1 sets the selected channel or the channel of the selected layer (S40).

Then, from the channel-to-broadcasting-format-correspondence-table database 11, the digital television broadcast receiving apparatus 1 reads out the broadcasting-format-correspondence table 11b for the set channel (S41) (FIG. 9).

Subsequently, based on the read broadcasting-format-correspondence table 11b, the digital television broadcast receiving apparatus 1 sets the mode, modulation method, guard interval and inner code to the set or selected layer (S42, S43, S44, S45). For example, when layer C of channel 201 is to be switched to layer A of the same channel, 3, DQPSK, ¼ and ⅞ are respectively the mode, modulation method, guard interval and inner code, if the broadcasting format is as shown in FIG. 9.

Then, the digital television broadcast receiving apparatus 1 obtains the segments of the corresponding layer from the received digital broadcast signal DS (S46). When layer C of channel 201 is to be switched to layer A of the same channel, according to FIG. 9, the single-segment stream of layer A is obtained from the channel 201 digital broadcast signal DS.

Based on the set guard interval, the digital television broadcast receiving apparatus 1 removes the guard interval from each obtained segment (S47).

Further, the digital television broadcast receiving apparatus 1 executes FFT on the segment from which the guard interval has been removed and then picks out the TMCC signal and the pilot signal from the segment (S49).

Then, the digital television broadcast receiving apparatus 1 performs frequency de-interleaving (S50) and time de-interleaving (S51).

Furthermore, based on the set mode, modulation method and inner code, the digital television broadcast receiving apparatus 1 synchronizes the segment with an OFDM frame (S52) and finally obtains an MPEG2 TS (S53).

Note that processing steps S40 through S53 in this embodiment are an example of the "switching step" as set forth in the appended claims.

With reference to FIGS. 8 and 17, the accounting scheme switching processing in the digital television broadcast receiving apparatus 1 will be described with further reference to the flowchart of FIG. 20. FIG. 20 is the flowchart of the accounting scheme switching processing performed by the digital television broadcast receiving apparatus 1.

The digital television broadcast receiving apparatus 1 judges whether "Continuity Oriented Accounting" is selected in the fee accounting setting screen FS (S60) (see FIG. 13).

If "Continuity Oriented Accounting" is selected, the digital television broadcast receiving apparatus 1 judges whether or not a reception condition-based switching principle is set by the reception mode setting screen WS (S61) (see FIG. 12). If some reception condition-based switching principle is set, the digital television broadcast receiving apparatus 1 proceeds with the switching rule generation processing shown in FIG. 18. If no reception condition-based switching principle is selected, the digital television broadcast receiving apparatus 1 obtains the channel set by the user (S62) and selects a layer having the fewest segments from the layers of the channel to be switched (S63). For example, in the case of FIG. 9, if layer C of channel 201 is being output, the 1-segment layer A is selected as the next layer to be output.

If "Continuity Oriented Accounting" is not selected, the digital television broadcast receiving apparatus 1 judges whether or not "Image Quality Oriented Accounting" is selected in the fee accounting setting screen FS (S70) (See FIG. 13). If "Image Quality Oriented Accounting" is not selected, the digital television broadcast receiving apparatus 1 loops back to processing step S60.

If "Image Quality Oriented Accounting" is selected, the digital television broadcast receiving apparatus 1 obtains the channel set by the user (S71) and select a layer consisting of the largest number of segments from the layers of the channel to be switched (S72). For example, in the case of FIG. 9, if layer C of channel 201 is being output, the 9-segment layer B is selected as the next layer to be output.

After a layer is selected at S63 or S72, the digital television broadcast receiving apparatus 1 proceeds with the layer switching processing shown in FIG. 19.

Figure 21:
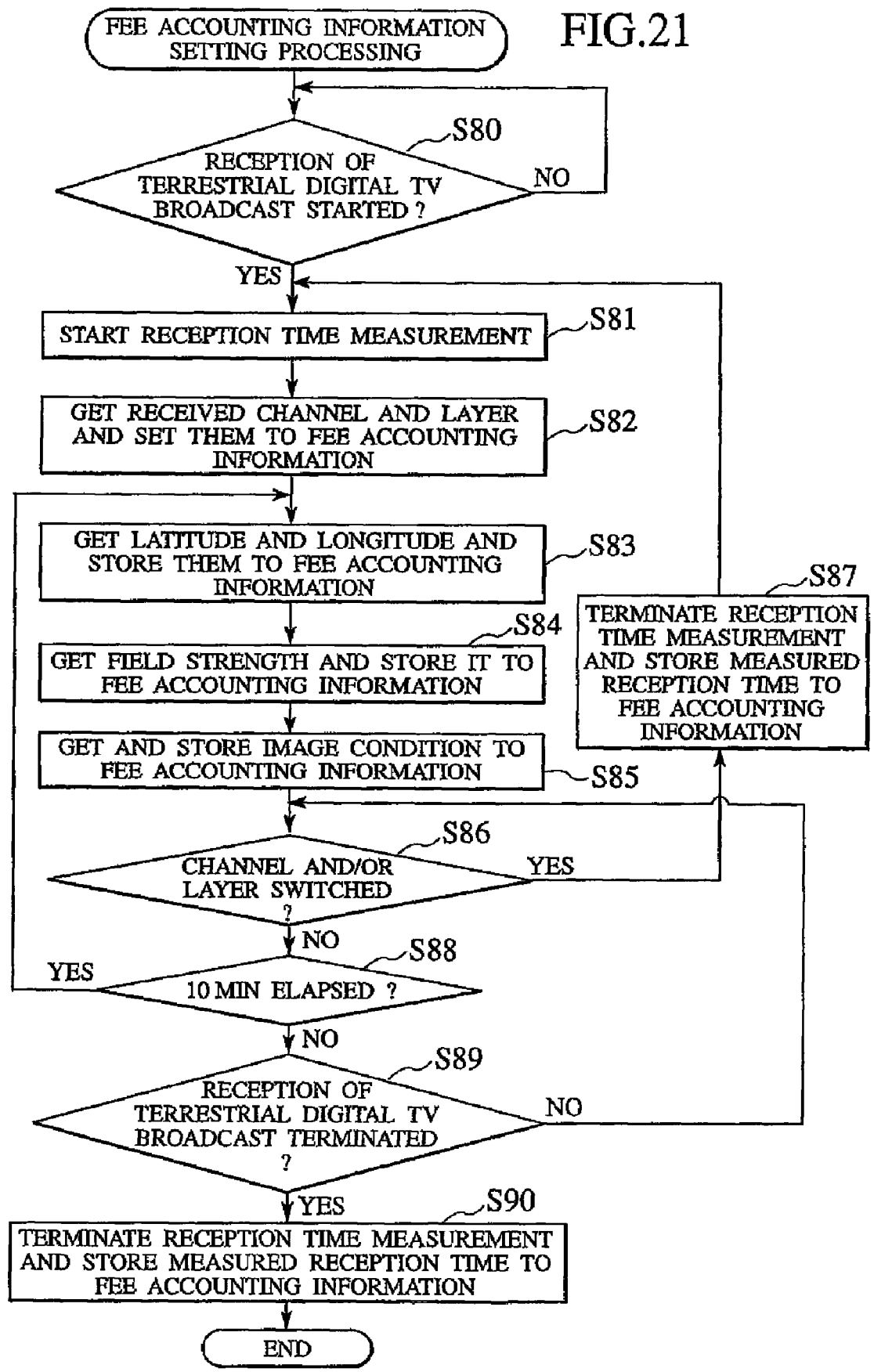
FIG. 21 is a flowchart of fee accounting information setting processing in the digital television broadcast receiving apparatus according to the invention.

With reference to FIGS. 8 and 17, the fee accounting information setting processing in the digital television broadcast receiving apparatus 1 will be described with further reference to the flowchart of FIG. 21. FIG. 21 is the flowchart of the fee accounting information setting processing performed in the digital television broadcast receiving apparatus 1.

The digital television broadcast receiving apparatus 1 judges whether or not the reception of a terrestrial digital broadcast is started by the user (S80); and, if reception has started, it proceeds with the fee accounting information 26a (see FIG. 17) setting processing.

First, the digital television broadcast receiving apparatus 1 starts reception time measurement (S81).

Then, the digital television broadcast receiving apparatus 1 obtains the currently received (that is, currently output) channel/layer and sets the information to the fee accounting information 26a (S82) (see FIG. 17).

Then, the digital television broadcast receiving apparatus 1 obtains the current latitude/longitude from the navigation device and sets the information to the fee accounting information 26a (S83) (see FIG. 17).

Further, the digital television broadcast receiving apparatus 1 obtains the field strength of the currently received layer to sets the information to the fee accounting information 26a (S84) and obtains the image condition of the currently received layer to set the information to the fee accounting information 26a (S85) (see FIG. 17).

Then, the digital television broadcast receiving apparatus 1 judges whether the channel and/or layer are switched by the user or the layer is switched automatically (S86). If the channel and/or layer are switched, the digital television broadcast receiving apparatus 1 terminates the reception time measurement, and it sets the measured reception time to the fee accounting information 26a before looping back to processing step S81 in order to proceed with the setting of fee accounting information 26a for the new channel/layer (see FIG. 17).

If the channel and/or layer are not switched, the digital television broadcast receiving apparatus 1 judges whether or not ten minutes have passed since the last latitude and longitude were obtained (S88). If ten minutes have passed, the digital television broadcast receiving apparatus 1 loops back to processing step S83 to set the latitude, longitude, field strength and image condition, which are to be measured every ten minutes, to the fee accounting information.

If ten minutes have not passed, the digital television broadcast receiving apparatus 1 judges whether the reception of the terrestrial digital television broadcast is terminated (S89). If the reception is not terminated, the digital television broadcast receiving apparatus 1 loops back to processing step S86.

If the reception is terminated, the digital television broadcast receiving apparatus 1 terminates the reception time measurement and sets the measured reception time to the fee accounting information 26a before terminating the processing (S90) (see FIG. 17).

Figure 22:
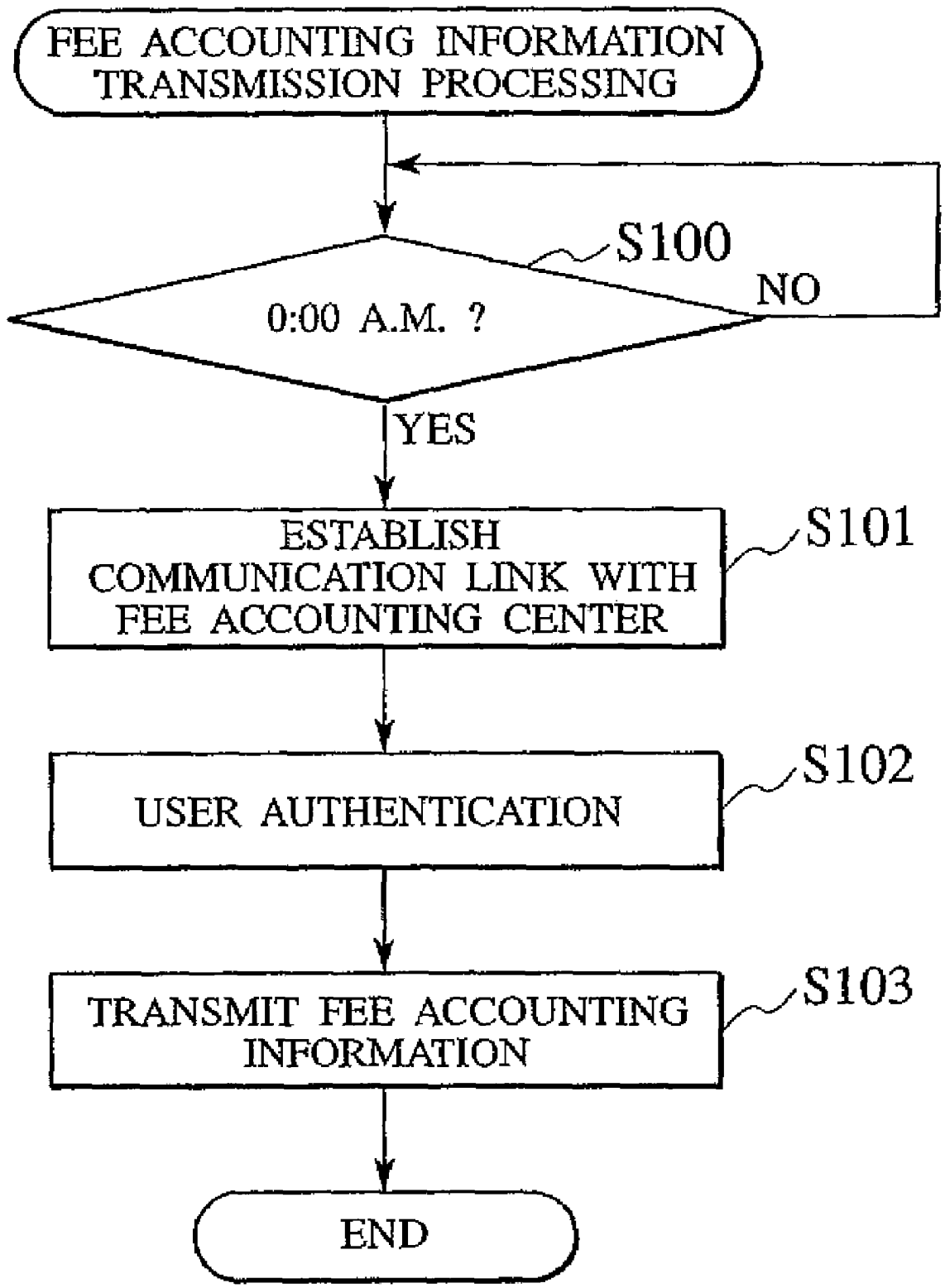
FIG. 22 is a flowchart of fee accounting information transmission processing in the digital television broadcast receiving apparatus according to the invention.

With reference to FIGS. 8 and 17, the fee accounting information transmission processing of the digital television broadcast receiving apparatus 1 will be described with further reference to the flowchart of FIG. 22. FIG. 22 is the flowchart of the fee accounting information transmission processing in the digital television broadcast receiving apparatus 1.

The digital television broadcast receiving apparatus 1 judges whether or not it is 0:00 a.m. (S100).

At 0:00 a.m., the digital television broadcast receiving apparatus 1 connects with the fee accounting server (not shown in the figure) via the Internet IN to establish a communication link with the fee accounting center IS (S101) (see FIG. 7).

Then, the digital television broadcast receiving apparatus 1 sets the user ID, password, etc. for user authentication (S102).

After the user is authenticated, the digital television broadcast receiving apparatus 1 transmits the fee accounting information 26a stored in the previous day (S100) (See FIG. 17) and disconnects itself from the fee accounting server (not shown in the figure) before terminating the processing.

Figure 23:
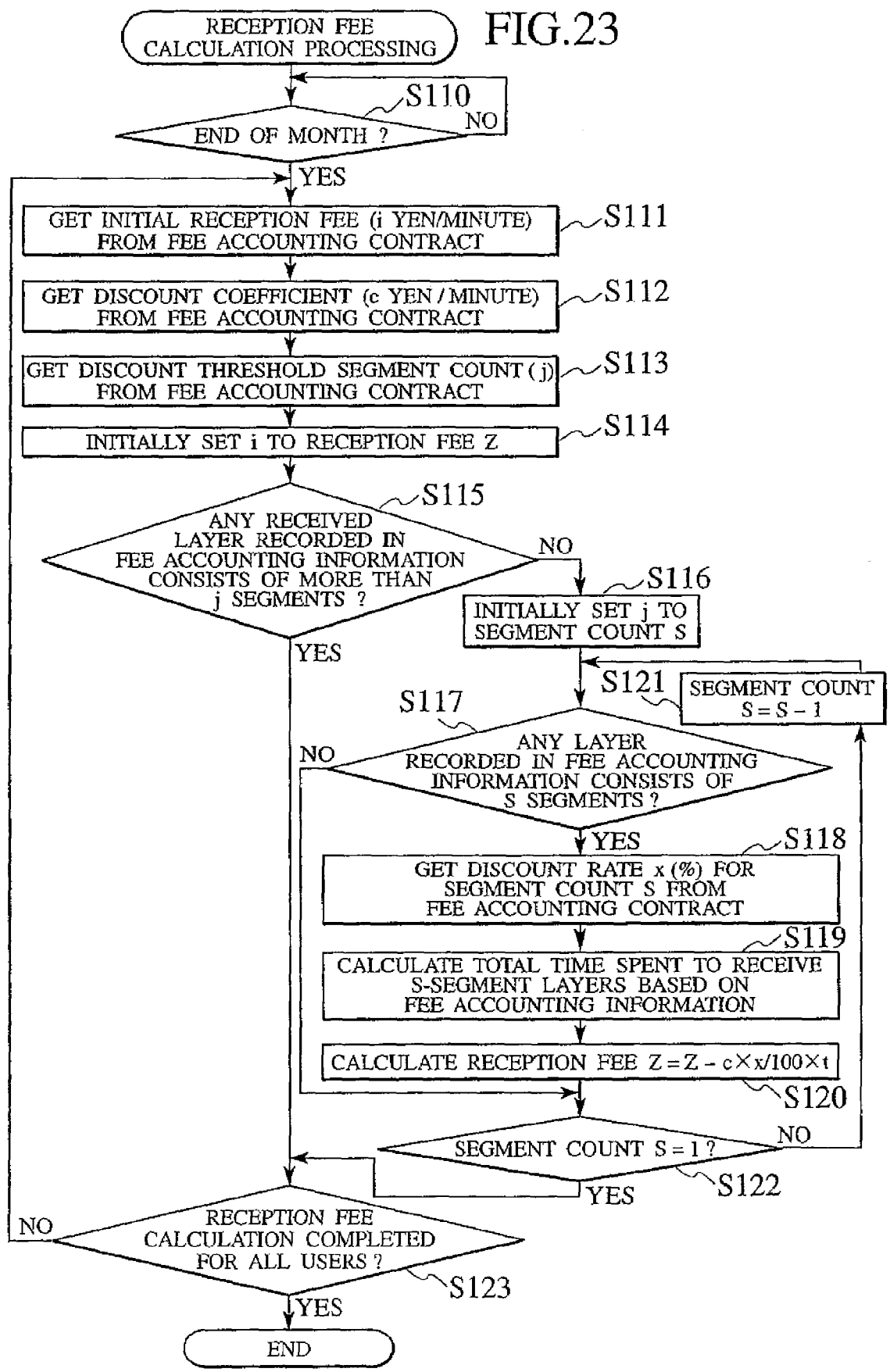
FIG. 23 is a flowchart of reception fee calculation processing in a fee accounting center according to the invention.

With reference to FIGS. 1, 7 and 17, a description will be made how a monthly reception fee to be billed for each user (that is, the amount of money to be paid for monthly reception by the digital television broadcast receiving apparatus 1 owned by the user) is calculated by the fee accounting center IS (fee accounting server, not shown in the figure). FIG. 23 is the flowchart of this fee calculation processing performed in the fee accounting center. It is assumed here by which each user has signed a fee accounting contract by which the monthly fee (Z yen) is determined by a fixed initial fee (i yen/month), a discount fee per minute (a discount coefficient (c yen/minute)) and a threshold segment count (j segments) and a segment count-dependent discount rate (x%). For example, the initial fee may be 1000 yen, the discount coefficient 1 yen/minute, and the discount segment count 6. Segment count-dependent discount may be 10% for 6- to 3-segment layers and 20% for 2- to 1-segment layers.

The fee accounting server judges whether today is the end of the month (S10). At the end of the month, the fee accounting server reads the fee accounting contract signed with each user to get the initial fee (i yen/month), discount coefficient (c yen/minute) and threshold segment count for discount (j segments) in order to calculate the monthly fee to be billed to the user. For example, the initial fee, discount coefficient and threshold segment count for discount may be 1000 yen/month, 1 yen/minute and 6 segments, respectively.

The fee accounting server sets the initial fee (i yen/month) to the reception fee (Z yen) (S114). For example, 1000 yen is set to the reception fee (Z yen).

Then, the fee accounting server examines the fee accounting information 26a (See FIG. 17) sent from the user (digital television broadcast receiving apparatus 1) during the month to judge whether the number of segments in each received layer is not larger than the threshold segment count (j) (S115). If there is no such a layer the fee accounting server goes to processing step S123 with the monthly fee (z yen) set to the initial fee (i yen). For example, if the threshold segment count is 6 and the received layer does not include a layer having no more than six segments, the reception fee is the initial fee of 1000 yen, since the discounting condition is not met.

If the number of segments in some received layer is not larger than the threshold segment count (j), the fee accounting server initially sets the threshold segment count (j) to the discount calculation segment count (S) and proceeds to the processing for discounting the initial fee (i yen) (S116). For example, if the threshold segment count is 6 and the received layers include layers C (3-segment layer) and A (1-segment layer) of channel 201, as shown in FIG. 9, the initial monthly fee of 1000 yen is discounted, since the discounting condition is met.

Then, the fee accounting server examines the one-month fee accounting information 26a (see FIG. 17) to judge whether the number of segments in any received layer is equal to the discount calculation segment count (S) (S117). If there is no such a layer, the fee accounting server goes to processing step S122 in order to change the discount calculation segment count (S). For example, if the discount calculation segment count (S) is 6 and no received layer consists of 6 layers, the segment count (S) is decremented by 1.

If the number of segments in some received layer is equal to the discount calculation segment count (S), the fee accounting server obtains the discount rate (x%) for the segment count (S) from the fee accounting contract (S118). For example, the discount rate may be 10% for 3-segment layers and 20% for 1-segment layers. Further, the fee accounting server examines the one-month fee accounting information 26a (see FIG. 17) to calculate the total time (t minutes) spent to receive layers each consisting of S segments (S119). Then, the fee accounting server calculates the reception fee (z yen) according to the equation (Previously calculated reception fee (Z yen)−Discount coefficient (c yen/min)×(Discount rate (x%)/100)×Reception time (t minutes)). For example, if the current segment count (S) is 3, the previously calculated reception fee is 929 yen, the discount coefficient is 1 yen/minute, the discount rate is 10% and the reception time is 500 minutes, the reception fee calculated this time results in 879 yen (929−1×($^{10}/_{100}$)×500).

After the reception fee (Z yen) is calculated, the fee accounting server judges whether or not the current segment count (S) is 1.

If the segment count (S) is not 1, the fee accounting server subtracts 1 from the segment count (S) (S121) before looping back to processing step S117 for discount calculation with the next segment count (S).

If the segment count (S) is 1, the fee accounting server determines the calculated reception fee (Z yen) as the monthly fee to be billed for the user and terminates the discount calculation for the user before looping back to the processing step S123.

Each time the reception fee calculation processing is completed for a user, the fee accounting server determines whether or not the reception fee calculation processing is completed for all users (S123). If it is not completed, the fee accounting server loops back to processing step S111. If it is completed, the fee accounting server terminates the processing.

Figure 24:
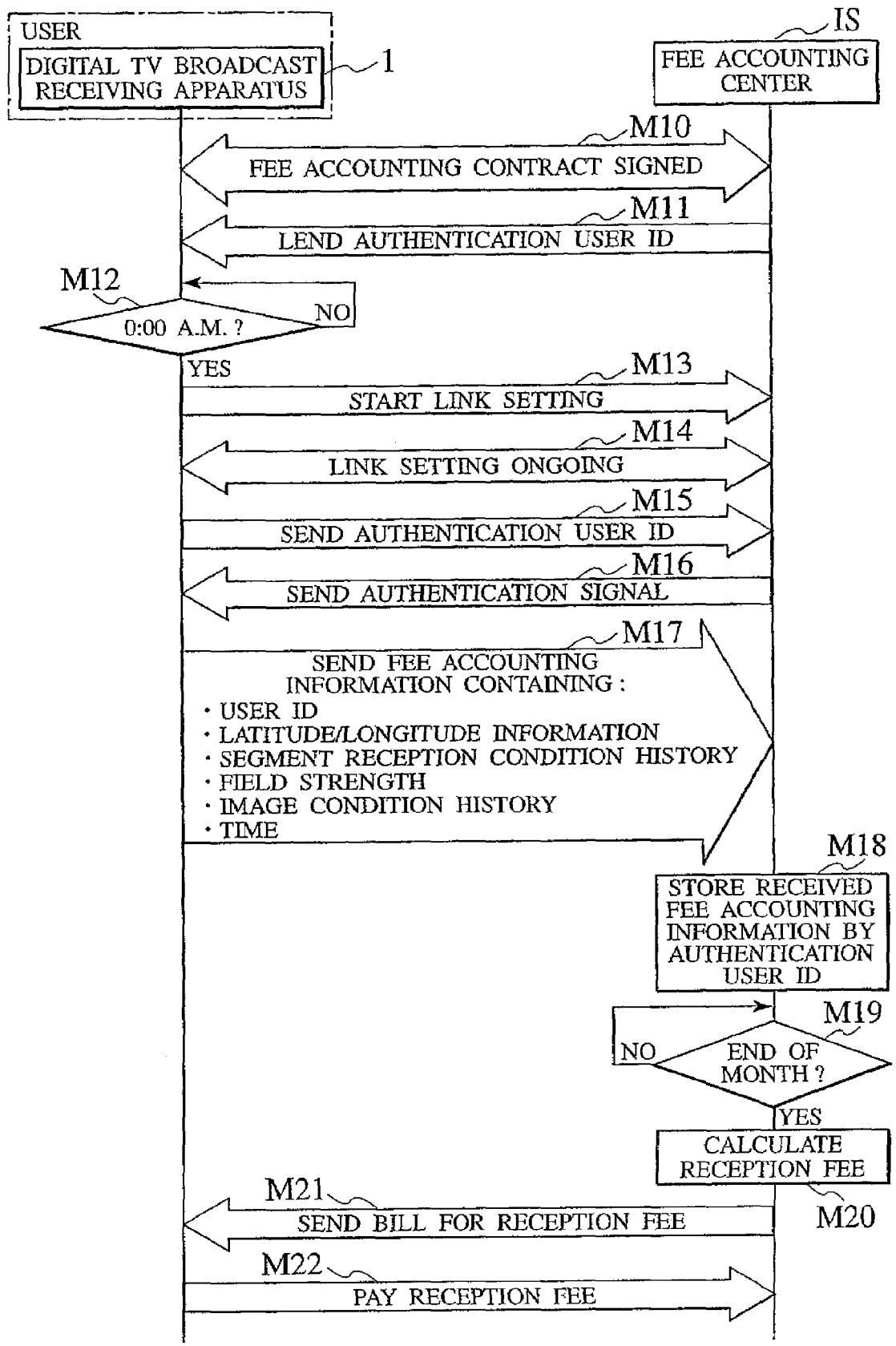
FIG. 24 is a flowchart of fee accounting-related exchanges between a digital television broadcast receiving apparatus (user) and a fee accounting center according to the invention.

With reference to FIGS. 1 and 23, fee accounting-related interactions between the digital television broadcast receiving apparatus 1 (user) and the fee accounting center IS (fee accounting server) will be described with further reference to FIG. 24. FIG. 24 is the flowchart of the fee accounting-related interactions between the digital television broadcast receiving apparatus 1 (user) and the fee accounting center IS (fee accounting server).

If the user wants to receive a terrestrial digital television broadcast, the user signs a fee accounting contract with the fee accounting center IS of the management center CS (M10). The user can enter into the fee accounting contract either by accessing the Internet home page opened by the fee accounting center IS from the digital television broadcast receiving apparatus 1, by mail or by directly visiting the office of the fee accounting center IS.

After a fee accounting contract is concluded, the fee accounting center IS lends a user ID, which is used for authentication when the digital television broadcast receiving apparatus 1 is connected to the fee accounting server of the fee accounting center IS, and provides information, such as the IP (Internet Protocol) address of the fee accounting server (M11). At that time, the user's personal identification number etc. are also set as the case may be. To the fee accounting center, the user provides information, such as the IP address of the digital television broadcast receiving apparatus 1.

Once the reception of a terrestrial digital television broadcast is started, the digital television broadcast receiving apparatus 1 judges whether it is at 0:00 a.m. to transmit the one-day fee accounting information 26a (See FIG. 17) (M12).

At 0:00 a.m., the digital television broadcast receiving apparatus 1 initiates a link setting sequence with the fee accounting server by using the IP address of the fee accounting server (M13) and sets a link with the fee accounting server via the Internet IN (M14).

Once a link is set, the digital television broadcast receiving apparatus 1 transmits authentication information, such as the user ID or personal identification number to the fee accounting server (M15). In response, the fee accounting server checks the authentication information and sends back an authentication signal to the digital television broadcast receiving apparatus 1 (M16).

After the authentication is complete, the digital television broadcast receiving apparatus 1 transmits the fee accounting information 26a, which was recorded on the previous day, to the fee accounting server (M17).

After the fee accounting information 26a is transmitted, the fee accounting server stores the fee accounting information 26a in the fee accounting information database (not shown in the figure) where fee accounting information 26a is stored by user ID.

The fee accounting server judges whether today is the end of the month to calculate monthly fees (M19). At the end of each month, the fee accounting sever calculates reception fees by user (M20).

The fee accounting center IS bills each user for a reception fee on a monthly basis. This bill may be distributed either via the Internet IN to the digital television broadcast receiving apparatus 1 or by mail.

In response to this bill, the user pays the reception fee to the fee accounting center (M22). The money may be paid either by bank transfer, by mail or directly at the office of the fee accounting center IS.

Since fee accounting-related exchanges are performed as described above, both the user side and the fee accounting center IS side can leave most of the troublesome operations to the digital television broadcast receiving apparatus 1 and the fee accounting server, respectively. If the fee accounting contract is arranged in such a manner that the fee accounting information 26a may be used for the research of audience ratings, the audience management center RS of the management center CS can effectively use the accounting information. In addition, since the fee accounting information 26 includes latitude/longitude, field strength, image condition and other information, the management center CS can locate wave interference areas and provide the information to each television station TS.

Figure 25:
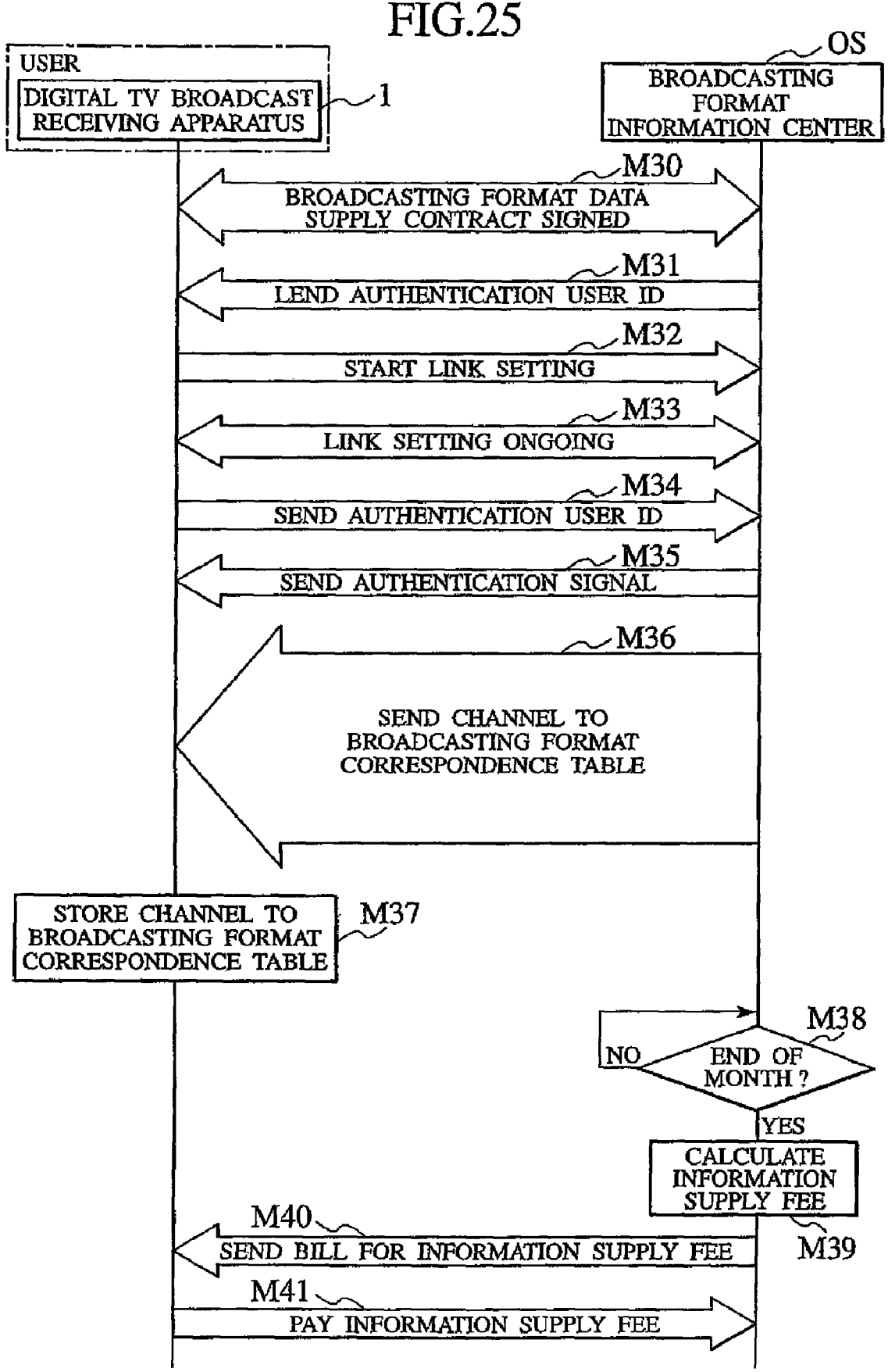
FIG. 25 is a flowchart of broadcasting format-related exchanges between a digital television broadcast receiving apparatus (user) and a broadcasting format information center according to the invention.

With reference to FIGS. 1 and 23, broadcasting format-related exchanges between the digital television broadcast receiving apparatus 1 (user) and the broadcasting format information center OS (broadcasting format information server) will be described along with the process flows shown in FIG. 25. FIG. 25 is a flowchart of broadcasting format-related exchanges between the digital television broadcast receiving apparatus (user) and the broadcasting format information center.

If the user wants to receive the channel-to-broadcasting-format table covering each television station via the Internet, the user enters into an information supply contract with the broadcasting format information center OS of the management center OS (M30). The user can enter into this information supply contract either by accessing the Internet home page opened by the broadcasting format information center OS from the digital television broadcast receiving apparatus 1, by mail or directly at the office of the broadcasting format information center OS.

After the information supply contract is executed, the broadcasting format information center OS lends a user ID, which is used for authentication when the digital television broadcast receiving apparatus 1 is connected to the broadcasting format information server of the broadcasting format information center OS, and it provides information, such as the IP address of the broadcasting format information server (M31). At that time, the user's personal identification number, etc. are also set as the case may be. To the broadcasting format information center OS, the user provides information, such as the IP address of the digital television broadcast receiving apparatus 1.

When commanded by the user or periodically (for example once a day), the digital television broadcast receiving apparatus 1 initiates a link setting sequence with the broadcasting format information server by using the IP address of the broadcasting format information server (M32) and sets a link with the broadcasting format information server via the Internet IN (M33).

Once the link is set, the digital television broadcast receiving apparatus 1 transmits the authentication information, such as the user ID or personal identification number, to the broadcasting format information server (M34). In response, the broadcasting format information server checks the authentication information and sends back an authentication signal to the digital television broadcast receiving apparatus 1 (M35). Although the link setting is initiated from the digital television broadcast receiving apparatus 1 in steps M32 through M35, the information service may also be designed in such a manner that the link setting is carried out from the broadcasting format information server periodically, or every time the broadcasting station TS changes its broadcasting format.

After the authentication is complete, the latest channel-to-broadcasting-format-correspondence table is transmitted to the digital television broadcast receiving apparatus 1 (M36) (see FIG. 9).

Upon receiving the channel-to-broadcasting-format-correspondence table, the digital television broadcast receiving apparatus 1 stores the table in the channel-to-broadcasting-format-correspondence-table database 11 (M37).

Note that processing steps M32 through M37 are an example of the "acquisition step" as set forth in the appended claims.

The broadcasting format information server judges whether today is the end of the month to calculate monthly fees (M38).

At the end of each month, the broadcasting format information server calculates information supply fees by user (M39). The information supply fee for each user is calculated according to the information supply contract entered into with the user. The contract may be arranged in such a manner that the monthly fee varies according to the amount of information supplied or the number of times information is transmitted or a fixed amount of money is billed as the monthly information supply fee. In the last case, a calculation is not carried out.

The broadcasting format information center OS bills each user for an information supply fee on a monthly basis (M40). This bill may be distributed either via the Internet IN to the digital television broadcast receiving apparatus 1 or by mail.

In response to this bill, the user pays the information supply fee to the broadcasting format information center OS (M41).

The money may be paid either by bank transfer, by mail or directly at the office of the broadcasting format information center OS.

Since broadcasting format-related exchanges are performed as described above, even if a television station TS changes its broadcasting format or a new television station TS is opened, the user side can quickly be notified of the new broadcasting format and, therefore, can immediately output a television program provided by the television station TS.

Although an embodiment of the present invention has been described so far, the present invention is not limited to this specific embodiment and can be implemented in a variety of embodiments.

For example, although in the above-described embodiment, automatic layer switching is effected based on a switching principle set by the user, the configuration of the embodiment may be such that layer switching is entirely determined by the digital receiving apparatus side, so as not to cause image/sound interruption without having any switching principle set by the user.

Although the digital broadcast receiving apparatus according to the above-described embodiment of the present invention assumes the use of a television mounted on an automobile, it may also be applied to a fixed television installed in a home or the like, a television mounted on a different movable body, such as a train or airplane, and a television integrated into a portable telephone, as a feature.

In addition, although a digital broadcast receiving apparatus according to the embodiment of the present invention assumes application of the invention to a digital television broadcast, it may also be applied to a digital sound broadcast, a digital text broadcast, etc.

Although a digital broadcast receiving apparatus according to the embodiment of the present invention assumes application of the invention to a terrestrial digital broadcast, it may also be applied to a BS broadcast, a CS broadcast and other satellite broadcasts.

Although the embodiment is configured in such a manner that each broadcast station's broadcasting format information is supplied via the Internet, the information may also be supplied by other communication media, such as a dedicated circuit and a digital broadcast.

Although the embodiment assumes application of the invention to fee-charged television broadcast, it may also be applied to free television broadcast.

Although the embodiment is configured in such a manner that a management center performs fee accounting and broadcasting format information services on behalf of all television stations, the configuration may also be such that each broadcast station performs fee accounting and transmits its broadcasting format information.

Although the management center in the embodiment is a separate company independent of all television stations, it is also possible that each television station operates a management center or all or some broadcast stations cooperatively operate a management center.

Although the embodiment is configured in such a manner that digital broadcast signals from a plurality of television stations are aired from a television tower, the configuration may also be such that the broadcast signal of each television station is aired from its relay stations.

Although the mode, carrier modulation method, guard interval and error correction inner code are set as parameters in the embodiment, the configuration may further include time-interleave, frequency-interleave, error correction code and other parameters.

Although the embodiment is configured in such a manner that the image quality is detected as a reproduction condition and is used as data for layer switching, the image quality may also be detected as a reproduction condition and used as data for layer switching.

Although the embodiment is configured in such a manner that layer information and layer switching information are provided by visual means of marks, text messages and bars, they may be provided by one or two means of the three means or in a different fashion or by acoustic means.

Although the embodiment is configured in such a manner that field strength and image quality information is stored periodically as fee accounting information, the configuration may also be such that the information is stored only when the conditions worsen or each time the automobile travels a certain distance.

According to the present invention, it is possible to continuously output images and sound by switching to a better reception condition layer, if the currently output layer is under bad reception conditions.

While the invention has been described with reference to preferred embodiments, it is to be understood that the words which have been used are words of description rather than limitation and that changes within the purview of the appended claims may be made without departing from the true scope and spirit of the invention in its broader aspects.

What is claimed is:

1. A digital broadcast receiving apparatus comprising: means for dividing a transmission bandwidth of one channel into a plurality of segments;
a bandwidth divider for receiving a plurality of digital broadcast signals which are simultaneously transmitted on a layer including one or more of the segments;
broadcasting format retention means for associating with data on a broadcasting format, for each layer, of each broadcast station per channel and retaining it;
switching means for getting the data on the broadcasting format, for each layer, which corresponds to a selected channel with reference to the data on the broadcasting format, for each layer, of each broadcast station retained by the broadcasting format retention means, and demodulating the digital broadcast signal received by using the gotten data on the broadcasting format, for each layer, into data for decoding;
decoding means for decoding the demodulated data for decoding into image data and sound data;
field strength detection means for detecting a field strength of the received digital broadcast signal;
reproduction condition detection means for detecting a number of block noises of the layer from the decoded image data; and
layer decision means for comparing a size of evaluation value, for each layer, by using an evaluation measure including the detected electric field and the number of block noises as elements of the evaluation measure and determining a layer having a larger evaluation value,
wherein the evaluation value is calculated by multiplying the detected number of block noises by a first weighting conversion factor ($\alpha$), multiplying the differential field strength by a second weighting conversion factor ($\beta$), and adding these two multiplied values,
wherein the first and second weighting conversion factors respectively establish importance of image quality and field strength in the evaluation, and
wherein the differential field strength is calculated by subtracting a reference field strength from the detected field strength.

2. A digital broadcast receiving method comprising:
dividing a transmission bandwidth of one channel into a plurality of segments;
receiving a plurality of digital broadcast signals which are simultaneously transmitted on a layer including one or more of the segments;
outputting images and sound by layer from the received digital broadcasting signal;
a broadcasting format retention step of associating with data on a broadcasting format, for each layer, of each broadcast station per channel and retaining it;
a switching step of getting the data on the broadcasting format, for each layer, which corresponds to a selected channel with reference to the data on the broadcasting format, for each layer, of each broadcast station retained by the broadcasting format retention step, and demodulating the digital broadcast signal received by using the gotten data on the broadcasting format, for each layer, into data for decoding;
a decoding step of decoding the demodulated data for decoding into image data and sound data;
a field strength detection step of detecting a field strength of the received digital broadcast signal;
a reproduction condition detection step of determining whether or not data of each macro block in one screen in the decoded image is normal and detecting a number of block noises of the layer; and
a layer decision step of comparing the field strength, for each layer, of the detected received digital broadcasting signal and a size of evaluation value, for each layer, calculated by using the number of block noises of the layer in the decoded demodulated image data from the received digital broadcast signal and determining a layer having a larger evaluation value as a reproduction layer,
wherein the digital broadcast receiving apparatus is mounted in a mobile, and outputs the image data and the sound data corresponding to the reproduction layer determined by the layer decision step,
wherein the evaluation value is calculated by multiplying the detected number of block noises by a first weighting conversion factor ($\alpha$), multiplying the differential field strength by a second weighting conversion factor ($\beta$), and adding these two multiplied values,
wherein the first and second weighting conversion factors respectively establish importance of image quality and field strength in the evaluation, and
wherein the differential field strength is calculated by subtracting a reference field strength from the detected field strength.

* * * * *